US012516207B2

(12) United States Patent
Sato et al.

(10) Patent No.: US 12,516,207 B2
(45) Date of Patent: Jan. 6, 2026

(54) AQUEOUS PRIMER COMPOSITION AND INK SET, AND PRINTED MATTER

(71) Applicant: SAKATA INX CORPORATION, Osaka (JP)

(72) Inventors: Yoichi Sato, Osaka (JP); Kazuki Moriyasu, Osaka (JP); Eri Ueda, Osaka (JP); Takaaki Sano, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 845 days.

(21) Appl. No.: 17/285,080

(22) PCT Filed: Oct. 28, 2019

(86) PCT No.: PCT/JP2019/042085
§ 371 (c)(1),
(2) Date: Apr. 13, 2021

(87) PCT Pub. No.: WO2020/095736
PCT Pub. Date: May 14, 2020

(65) Prior Publication Data
US 2021/0348011 A1 Nov. 11, 2021

(30) Foreign Application Priority Data
Nov. 5, 2018 (JP) .................. 2018-208246

(51) Int. Cl.
| | | |
|---|---|---|
| *C09D 11/38* | (2014.01) | |
| *B41J 2/01* | (2006.01) | |
| *B41M 5/00* | (2006.01) | |
| *C08K 3/16* | (2006.01) | |
| *C08K 5/098* | (2006.01) | |
| *C08L 75/06* | (2006.01) | |
| *C09D 11/102* | (2014.01) | |
| *C09D 11/54* | (2014.01) | |
| *C09D 175/06* | (2006.01) | |

(52) U.S. Cl.
CPC ............ *C09D 11/38* (2013.01); *B41J 2/01* (2013.01); *B41M 5/0047* (2013.01); *B41M 5/0064* (2013.01); *C08K 3/16* (2013.01); *C08K 5/098* (2013.01); *C08L 75/06* (2013.01); *C09D 11/102* (2013.01); *C09D 11/54* (2013.01); *C09D 175/06* (2013.01); *C08K 2003/162* (2013.01); *C08K 2003/166* (2013.01); *C08L 2201/52* (2013.01)

(58) Field of Classification Search
CPC ....... C09D 11/38; C09D 11/102; C09D 11/54; C09D 175/06; B41J 2/01; B41M 5/0047; B41M 5/0064; C08K 3/16; C08K 5/098; C08K 2003/162; C08K 2003/166; C08L 2201/52; C08L 75/06; C08L 11/104; C08L 11/322; C08L 11/40
See application file for complete search history.

(56) References Cited

U.S. PATENT DOCUMENTS

| | | | |
|---|---|---|---|
| 2003/0103129 A1* | 6/2003 | Tanaka .................. | C09D 11/30 347/105 |
| 2008/0152825 A1* | 6/2008 | Mukai .................... | C09D 5/002 427/466 |
| 2013/0169724 A1* | 7/2013 | Gotou .................... | C09D 11/54 347/100 |
| 2013/0260114 A1 | 10/2013 | Saitou et al. | |
| 2014/0106140 A1 | 4/2014 | Ikeda et al. | |
| 2016/0023456 A1 | 1/2016 | Yoneyama et al. | |
| 2018/0282567 A1 | 10/2018 | Ishida | |
| 2020/0010708 A1 | 1/2020 | Sugihara et al. | |
| 2020/0392360 A1 | 12/2020 | Sato et al. | |

FOREIGN PATENT DOCUMENTS

| | | | | |
|---|---|---|---|---|
| JP | H09176545 | A * | 7/1997 | ............ C09D 11/30 |
| JP | 2000309160 | A | 11/2000 | |
| JP | 2002011942 | A | 1/2002 | |
| JP | 2006281570 | A | 10/2006 | |
| JP | 2012250416 | A | 12/2012 | |
| JP | 2013022910 | A | 2/2013 | |
| JP | 2013193212 | A | 9/2013 | |
| JP | 2014019811 | A | 2/2014 | |

(Continued)

OTHER PUBLICATIONS

International Search Report (ISR) mailed Nov. 26, 2019, issued for International application No. PCT/JP2019/042085. (2 pages).
A Notice of Reasons for Refusal issued by the Japanese Patent Office on Mar. 7, 2023, for Japanese counterpart application No. 2018-208246. (3 pages).
Extended European Search Report (EESR) dated Jul. 4, 2022, issued for European counterpart patent application No. EP19882893.1 (9 pages).
A Notice of Reasons for Refusal issued by the Japanese Patent Office on Oct. 4, 2022, for Japanese counterpart application No. 2018-208246. (3 pages).

(Continued)

*Primary Examiner* — Sophie Hon
(74) *Attorney, Agent, or Firm* — Law Office of Katsuhiro Arai

(57) ABSTRACT

An aqueous primer composition includes a water-soluble multivalent metal salt, a polyester-based polyurethane emulsion, and water. A set includes the aqueous primer composition and an inkjet recording ink composition. A printed matter obtained by using the set includes a base material layer, a primer layer containing the water-soluble multivalent metal salt and the polyester-based polyurethane, and a printing layer. The aqueous primer can offer excellent preservation stability, and can allow for formation of a printing layer having high adhesion, capable of forming high-quality images with little bleeding/mottled appearance when printing images, text, etc., to form a printing layer on a plastic film or other nonabsorbent medium using inkjet recording ink compositions, offering excellent water resistance and lamination suitability.

5 Claims, No Drawings

(56) References Cited

FOREIGN PATENT DOCUMENTS

| | | | |
|---|---|---|---|
| JP | 2014065826 A | 4/2014 | |
| JP | 2015168796 A | 9/2015 | |
| JP | 2016030337 A | 3/2016 | |
| JP | 2016196177 A | 11/2016 | |
| JP | 2017088646 A | 5/2017 | |
| JP | 2018165417 A | 10/2018 | |
| JP | 2019038117 A | 3/2019 | |
| JP | 2018122589 | 5/2021 | |
| TW | 201130872 A * | 9/2011 | ............ C08G 18/10 |
| WO | 2019124473 A1 | 6/2019 | |

OTHER PUBLICATIONS

Notification Concerning Transmittal of International Preliminary Report on Patentability (PCT/IB/326) and Notification of Transmittal of Translation of the International Preliminary Report on Patentability (PCT/IB/338) mailed May 20, 2021, with International Preliminary Report on Patentability (PCT/IB/373) and Written Opinion of the International Searching Authority (PCT/ISA/237), for corresponding international application PCT/JP2019/042085 (13 pages).

* cited by examiner

AQUEOUS PRIMER COMPOSITION AND INK SET, AND PRINTED MATTER

CROSS-REFERENCE TO RELATED APPLICATIONS

This application is the U.S. National Phase under 35 U.S.C. § 371 of International Application PCT/JP2019/042085, filed Oct. 28, 2019, which claims priority to Japanese Patent Application No. JP2018-208246, filed Nov. 5, 2018. The International Application was published under PCT Article 21 (2) in a language other than English.

TECHNICAL FIELD

The present invention relates to an aqueous primer composition and ink set, as well as a printed matter.

BACKGROUND ART

The electrophotographic method, sublimation-type/melting-type thermal transfer method, inkjet method, etc., are known as image recording methods for forming images on paper and other target recording media based on image data signals. Among these, the inkjet method can be implemented with inexpensive devices and is also capable of forming images directly on target recording media by discharging inks only in necessary image parts. For this reason, the inkjet method is an excellent image recording method that allows for efficient use of inks, lowering of running cost, and reduction of noise.

However, a majority of inks used under the inkjet method (inkjet recording ink compositions) are aqueous inks. This means that, while inkjet recording ink compositions are suitable for printing on paper and other materials having ink absorbency, they are not suitable for printing on synthetic resins, metals, and other materials having no ink absorbency or materials having low ink absorbency (nonabsorbent media). Accordingly, inkjet recording primer inks, etc., are proposed to permit printing of inks, such as aqueous inks, on synthetic resins, metals and other nonabsorbent media.

Although inkjet recording ink compositions for resin film printing are known, which are printed directly on resin films, such inkjet recording ink compositions still don't have high enough lamination suitability or sufficient lamination strength to be used for printing on laminating resin films for food packaging, etc. Inkjet recording ink compositions having insufficient lamination strength can cause delamination between the layer they constitute and the laminate layer or resin film.

Patent Literature 1 describes applying a clear ink (primer) containing calcium ions, etc., on a resin film before printing it with inkjet recording ink compositions.

Patent Literature 2 proposes a recording method whereby a base layer is formed by applying a cyclic amide compound, a thermoplastic resin, and a primary solvent, and then aqueous pigment ink compositions are printed, on a target recording medium comprising a plastic film.

Patent Literature 3 proposes a recording method whereby a primer layer is formed by applying an inkjet recording primer ink containing at least one type of resin selected from the group that consists of fluorine/acrylic-based composite resins, silicone/acrylic-based composite resins, vinyl chloride/acrylic-based composite resins, ethylene-vinyl chloride copolymer resins, and chlorinated polyolefins, water, and an organic solvent, and then aqueous pigment ink compositions are printed, on a target recording medium comprising a polyolefin.

Patent Literature 4 describes an ink set consisting of two types of inks, one containing a reactive compound having specific functional groups and the other containing a compound having functional groups reactive to the aforementioned functional groups, which are printed one atop the other to allow for lamination.

Patent Literature 5 describes an inkjet recording primer ink to be provided on a target recording medium comprising a plastic film, wherein such inkjet recording primer ink contains a water-soluble multivalent metal salt, a chlorinated polyolefin emulsion, at least one of acrylic-based emulsion and vinyl acetate emulsion, and water.

BACKGROUND ART LITERATURE

Patent Literature

Patent Literature 1: Japanese Patent Laid-open No. 2016-196177
Patent Literature 2: Japanese Patent Laid-open No. 2006-281570
Patent Literature 3: Japanese Patent Laid-open No. 2015-168796
Patent Literature 4: Japanese Patent Laid-open No. 2014-65826
Patent Literature 5: Japanese Patent Laid-open No. 2017-88646

SUMMARY OF THE INVENTION

Problems to be Solved by the Invention

The invention described in Patent Literature 1 is a primer used simply for printing on resin films not followed by lamination.

Also, the methods described in Patent Literatures 2 and 3 do not allow inks to adhere sufficiently to various plastic films and are also inadequate in terms of drying property and bleeding property of inks on printed matters.

The invention described in Patent Literature 4 combines inkjet ink compositions for lamination, but since no primer is used, it is nothing more than printing two types of inks one atop the other. However, this invention fails to achieve improved lamination stability, etc., for aqueous inkjet ink compositions for lamination through combined use of a specific primer composition.

The invention described in Patent Literature 5 is not an inkjet recording primer ink intended for inkjet ink compositions for lamination.

The present invention was developed in light of these conventional problems and one object of the present invention is to obtain an aqueous primer that offers excellent preservation stability and, when printing images, text, etc., to form a printing layer on a plastic film or other nonabsorbent medium using inkjet recording ink compositions, allows for formation of a printing layer having high adhesion, capable of forming high-quality images with little bleeding/mottled appearance, and offering excellent water resistance and lamination suitability.

Also, another object of the present invention is to obtain an ink set offering excellent preservation stability and used for printing images, text, etc., to form a printing layer on a plastic film or other nonabsorbent medium using inkjet recording ink compositions, wherein such ink set allows for formation of a printing layer having high adhesion, capable of forming high-quality images with little bleeding/mottled appearance, and offering excellent water resistance and lamination suitability.

Furthermore, yet another object of the present invention is to obtain a printed matter comprising a plastic film or other nonabsorbent medium and a printing layer constituted by images, text, etc., printed with inkjet recording ink compositions, wherein such printed matter has a printing layer having high adhesion, capable of forming high-quality images with little bleeding/mottled appearance, and offering excellent water resistance and lamination suitability.

Means for Solving the Problems

After studying in earnest to solve the aforementioned problems, the inventors of the present invention found that, by constituting an aqueous primer composition for use on plastic films and other nonabsorbent media with a water-soluble multivalent metal salt, a polyester-based polyurethane emulsion, and water, an aqueous primer that offers excellent preservation stability could be formed and, when printing images, text, etc., to form a printing layer on a plastic film or other nonabsorbent medium using inkjet recording ink compositions, a printing layer having high adhesion, capable of forming high-quality images with little bleeding/mottled appearance, and offering excellent water resistance and lamination suitability, could be formed, and therefore completed the present invention.

To be specific, the present invention that solves the aforementioned problems primarily includes the constitutions below.

Item 1: An aqueous primer composition containing a water-soluble multivalent metal salt, a polyester-based polyurethane emulsion, and water.

Item 2: The aqueous primer composition according to Item 1, used for nonabsorbent media.

Item 3: The aqueous primer composition according to Item 1 or 2, wherein the compounding quantity of the water-soluble multivalent metal salt is 0.1% by mass to 20.0% by mass in equivalent solids content in the aqueous primer composition.

Item 4: The aqueous primer composition according to any one of Items 1 to 3, wherein the content of the polyester-based polyurethane emulsion is 0.1% by mass to 25.0% by mass in equivalent resin solids content of polyester-based polyurethane in the aqueous primer composition.

Item 5: A set including the aqueous primer composition according to any one of Items 1 to 4, and an inkjet recording ink composition.

Item 6: A printed matter comprising a base material layer, a primer layer containing a water-soluble multivalent metal salt and a polyester-based polyurethane, and a printing layer.

Effects of the Invention

The aqueous primer composition proposed by the present invention has excellent preservation stability. Also, by providing, on a plastic film or other nonabsorbent medium, a primer layer constituted by the aqueous primer composition proposed by the present invention, a printing layer having high adhesion, capable of forming high-quality images with little bleeding/mottled appearance, and offering excellent water resistance and lamination suitability, can be formed when printing images, text, etc., to form a printing layer thereon using inkjet recording ink compositions.

The printed matter proposed by the present invention is such that, by providing, on a plastic film or other nonabsorbent medium, a primer layer formed by an aqueous primer composition and then printing images, text, etc., to form a printing layer using inkjet recording ink compositions, a printing layer having high adhesion and capable of forming high-quality images with little bleeding/mottled appearance can be formed, and consequently a printed matter offering excellent water resistance and lamination suitability can be formed.

MODE FOR CARRYING OUT THE INVENTION

[Aqueous Primer Composition]

The aqueous primer composition proposed by the present invention contains a water-soluble multivalent metal salt, a polyester-based polyurethane emulsion, and water.

<Water-Soluble Multivalent Metal Salt>

The water-soluble multivalent metal salt is a salt of an organic acid or inorganic acid of a multivalent metal, whose solubility in 100 mL of water at 20° C. is 1 g/100 mL or higher, or preferably 2 g/100 mL or higher, or more preferably 20 g/100 mL or higher.

The water-soluble multivalent metal salt may be a double salt containing a multivalent metal.

The water-soluble multivalent metal salt may be a hydrate.

The multivalent metal may comprise one or two or more types of metals selected from among magnesium, calcium, strontium, zinc, copper, iron, and aluminum, for example.

The organic acid may comprise one or two or more types of fatty acids expressed by RCOOH (in the formula, R represents hydrogen, or an organic group having 1 to 30 carbon atoms), for example. Such organic acids include formic acid, acetic acid, propionic acid, octylic acid, lauric acid, myristic acid, pentadecylic acid, palmitic acid, margaric acid, stearic acid, 12-hydroxystearic acid, ricinoleic acid, oleic acid, vaccenic acid, linoleic acid, linolenic acid, arachidic acid, behenic acid, lignoceric acid, cerotic acid, montanic acid, melissic acid, lactic acid, citric acid, gluconic acid, malic acid, tartaric acid, succinic acid, malonic acid, glutaric acid, maleic acid, fumaric acid, glutaconic acid, benzoic acid, ascorbic acid, etc.

The inorganic acid may comprise one or two or more types of acids selected from among nitric acid, sulfuric acid, hydrogen chloride (hydrochloric acid), hydrogen bromide, hydrogen iodide, chloric acid, bromic acid, carbonic acid, and phosphoric acid.

If it is a multivalent metal salt of an organic acid, the water-soluble multivalent metal salt may comprise one or two or more types of metal salts selected from among zinc acetate, calcium acetate, strontium acetate, magnesium acetate, zinc formate, calcium formate, strontium formate, copper(II) formate, magnesium formate, calcium benzoate, magnesium benzoate, zinc benzoate, calcium lactate, magnesium lactate, aluminum lactate, iron(II) lactate, copper lactate, calcium ascorbate, magnesium ascorbate, calcium propionate, magnesium propionate, calcium gluconate, magnesium gluconate, zinc gluconate, copper gluconate, zinc citrate, copper citrate, and hydrates thereof, for example.

If it is a multivalent metal salt of an inorganic acid, the water-soluble multivalent metal salt may comprise one or two or more types of metal salts selected from among zinc chloride, aluminum chloride, calcium chloride, strontium chloride, iron chloride, copper(II) chloride, nickel chloride, magnesium chloride, manganese(II) chloride, zinc bromide, calcium bromide, strontium bromide, iron(II) bromide, copper(II) bromide, magnesium bromide, zinc iodide, calcium iodide, magnesium iodide, aluminum nitrate, calcium nitrate, strontium nitrate, iron(III) nitrate, copper(II) nitrate, magnesium nitrate, zinc sulfate, aluminum sulfate, iron(II) sulfate, iron(III) sulfate, copper sulfate, magnesium sulfate, potassium aluminum sulfate, calcium dihydrogen phosphate, calcium hydrocarbon, and hydrates thereof, for example.

Among these, one or two or more types of metal salts selected from among calcium acetate, calcium chloride, and magnesium chloride are preferred.

The compounding quantity of the water-soluble multivalent metal salt may be adjusted as deemed appropriate according to the type of salt and purpose of compounding, and is not limited in any way.

The lower limit of the content of water-soluble multivalent metal salt is 0.1% by mass or higher, or preferably 0.5% by mass or higher, or more preferably 1% by mass or higher, in equivalent solids content in the aqueous primer composition, for example. Also, the upper limit of the content of water-soluble multivalent metal salt is 20% by mass or lower, or preferably 15% by mass or lower, or more preferably 10% by mass or lower, in equivalent solids content in the aqueous primer composition, for example.

The content of water-soluble multivalent metal salt is 0.1 to 20% by mass, or preferably 0.5 to 15% by mass, or more preferably 1 to 10% by mass, in solids content in the aqueous primer composition, for example.

If the content of water-soluble multivalent metal salt is under 0.1% by mass, bleeding/mottled appearance may occur when a printing layer is formed by printing images, text, etc., using inkjet recording ink compositions on a primer layer constituted by the aqueous primer composition.

If the content of water-soluble multivalent metal salt exceeds 20% by mass, water resistance may drop when a printing layer is formed by printing images, text, etc., using inkjet recording ink compositions on a primer layer constituted by the aqueous primer composition. Also, the preservation stability of the aqueous primer composition may deteriorate or its lamination suitability may drop.

The equivalent quantity of multivalent metal atoms in the water-soluble multivalent metal salt is 0.02% by mass or higher, or preferably 0.13% by mass or higher, or more preferably 0.25% by mass or higher, in the aqueous primer composition from the viewpoints of preservation stability of the aqueous primer composition, its adhesion with nonabsorbent media, and so on.

Also, the equivalent quantity of multivalent metal atoms in the water-soluble multivalent metal salt is 11.0% by mass or lower, or preferably 8.0% by mass or lower, or more preferably 6.0% by mass or lower, in the aqueous primer composition from the viewpoints of preservation stability of the aqueous primer composition, its adhesion with nonabsorbent media, and so on.

<Polyester-Based Polyurethane Emulsion>

The polyester-based polyurethane emulsion is a component, in the aqueous primer composition, to improve its adhesive property with the base material (coating target) and the primer coating film.

In particular, it achieves good adhesive property with polyolefin films, polyester films, nylon films, and other plastic films.

The polyester-based polyurethane emulsion is an emulsion of a polyester-based polyurethane having a polyester skeleton in its molecule.

The polyester-based polyurethane having a polyester skeleton in its molecule can be obtained, for example, by using any known method to cause a polyol component containing a polyester polyol which is a polyol having a polyester skeleton in its molecule, to react with a polyisocyanate component, along with a chain extender, chain stopper, etc., that may be used as necessary, using an urethanization catalyst as necessary.

Also, any commercially available polyester-based polyurethane emulsion may be used.

The average grain size of the polyester-based polyurethane in the polyester-based polyurethane emulsion is preferably 50 to 1,000 nm, or more preferably 50 to 400 nm, or even more preferably 50 to 300 nm.

(Polyol Component Containing Polyester Polyol)
—Polyester Polyol—

The polyester polyol may comprise one or two or more types of polyester polyols selected from among: polyester polyols, each obtained by polycondensation-reacting a component containing a polycarboxylic acid or esterifiable derivative thereof, with a polyol-containing component; polyester polyols, each obtained by ring-opening polymerization-reacting cyclic esters using a polyol-containing component as an initiator; and polyester polyols, each obtained by copolymerizing the foregoing.

Although its molecular weight is not limited in any way, preferably the polyester polyol has a weight average molecular weight of 400 to 10,000. It should be noted that, in this Specification, "weight average molecular weight" refers to a value measured by gel permeation chromatograph (GPC) using polystyrene resin as a standard.

Component Containing Polycarboxylic Acid or Esterifiable Derivative Thereof

The polycarboxylic acid may be of any type so long as it is a compound having at least two carboxyl groups. Examples include dicarboxylic acid and tricarboxylic acid, where dicarboxylic acid is particularly preferred.

The polycarboxylic acid may comprise one or two or more types of polycarboxylic acids selected from among aromatic polycarboxylic acids, aliphatic polycarboxylic acids, and alicyclic polycarboxylic acids.

The polycarboxylic acid may comprise one or two or more types of polycarboxylic acids selected from among saturated polycarboxylic acids and unsaturated polycarboxylic acids.

The polycarboxylic acid may be an anhydride.

The esterifiable derivative of polycarboxylic acid may be, for example, an esterified product comprising a polycarboxylic acid and one or two or more types of aliphatic alcohols having 1 to 4 carbon atoms and/or polyalcohols having 1 to 4 carbon atoms, which can be reacted with a polyol to form a polyester.

Among the aromatic polycarboxylic acids, one or two or more types may be selected from among, for example, phthalic acid, isophthalic acid, terephthalic acid, trimellitic acid, tetrachlorophthalic acid, tetrabromophthalic acid and other halogenated phthalic acids, phthalic acid monosulfonate, isophthalic acid monosulfonate, terephthalic acid monosulfonate, and esterifiable derivatives thereof.

Among these, one or two or more types of aromatic polycarboxylic acids selected from among isophthalic acid, terephthalic acid, isophthalic acid monosulfonate, terephthalic acid monosulfonate, and esterifiable derivatives thereof, are preferred.

Among the aliphatic polycarboxylic acids, one or two or more types may be selected from among, for example, oxalic acid, malonic acid, succinic acid, glutaric acid, adipic acid, pimelic acid, cork acid, azelaic acid, sebacic acid, undecane dicarboxylic acid, dodecane dicarboxylic acid, multimeric fatty acid, maleic acid, fumaric acid, itaconic acid, and esterifiable derivatives thereof.

Among these, one or two or more types of aliphatic polycarboxylic acids selected from among glutaric acid, adipic acid, azelaic acid, sebacic acid, multimeric fatty acid, maleic acid, and esterifiable derivatives thereof, are preferred.

Among the alicyclic polycarboxylic acids, one or two or more types may be selected from among, for example, 1,2-cyclobutane dicarboxylic acid, 1,3-cyclobutane dicarboxylic acid, 1,2-cyclopentane dicarboxylic acid, 1,3-cyclopentane dicarboxylic acid, hexahydrophthalic acid, 1,3-cyclohexane dicarboxylic acid, 1,4-cyclohexane dicarboxylic acid, 4-methyl hexahydrophthalic acid, tricyclodecane dicarboxylic acid, tetrahydrophthalic acid, 4-methyl tetrahydrophthalic acid, and esterifiable derivatives thereof.

It should be noted that these polycarboxylic acids may be used in the forms of cis-isomers and trans-isomers, as well as mixtures of both isomers.

The component containing one or two or more types of polycarboxylic acids or esterifiable derivatives thereof may contain a monocarboxylic acid.

The monocarboxylic acid may comprise one or two or more types of monocarboxylic acids selected from among acetic acid, propionic acid, benzoic acid, t-butyl benzoic acid, lauric acid, isononanoic acid, fatty acids of naturally-derived oils, acrylic acid, methacrylic acid, and crotonic acid.

Polyol-Containing Component

The polyol may be an aromatic, aliphatic, or alicyclic polyol.

The polyol may be a saturated polyol or unsaturated polyol.

The polyol may be of any type so long as it is a compound having at least two hydroxyl groups, such as diol and triol, where diol is particularly preferred.

The diol may comprise one or two or more types of diols selected from among, for example, ethylene glycol, 1,2-propanediol, 1,3-propanediol, 1,2-butanediol, 1,3-butanediol, 1,4-butanediol, 1,2-pentanediol, 1,3-pentanediol, 1,4-pentanediol, 1,5-pentanediol, 1,2-hexanediol, 1,3-hexanediol, 1,4-hexanediol, 1,5-hexanediol, 1,6-hexanediol, neopentyl glycol, diethylene glycol, 3-methyl-1,5-pentanediol, alkane($C_7$-$C_{22}$)diol, triethylene glycol, propylene glycol, dipropylene glycol, 1,2-cyclohexanediol, 1,3-cyclohexanediol, 1,4-cyclohexanediol, 1,2-cyclohexane dimethanol, 1,3-cyclohexane dimethanol, 1,4-cyclohexane dimethanol, trimethyl pentanediol, ethylbutyl propanediol, diethyl octanediol, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-t-butyl-1,3-propanediol, 2-butyl-2-propyl-1,3-propanediol, 1-dihydroxymethyl-bicyclo[2.2.1]heptane, 2,2-diethyl-1,3-propanediol, 2,2-dipropyl-1,3-propanediol, 2-cyclohexyl-2-methyl-1,3-propanediol, 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-(2'-hydroxypropyl)-benzene, 1,4-dihydroxy-2-butene, 2,6-dimetyl-1-octene-3,8-diol, bishydroxyethoxybenzene, xylylene glycol, bis-2-hydroxyethylene terephthalate, bisphenol A, bisphenol F, hydrogenated bisphenol A, and 1,3-(2'-hydroxypropyl)-benzene.

The triol may comprise one or two or more types of triols selected from among, for example, trimethylolethane, trimethylolpropane, and glycerin.

The polyol-containing component may contain a mono-ol.

The mono-ol is a compound having one hydroxyl group, and may be an alcohol or phenol.

The mono-ol may comprise one or two or more types of mono-ols selected from among, for example, ethanol, propanol, 1-butanol, 2-butanol, t-butyl alcohol, amyl alcohol, hexanol, aliphatic alcohol, allyl alcohol, and phenol.

Lactones

The lactones may be of one or two or more types selected from among, for example, ε-caprolactone, poly-β-methyl-δ-valerolactone, γ-butyrolactone, and γ-valerolactone.

Manufacturing of Polyester Polyol

The polyester polyol is manufactured by polycondensation-reacting a component containing a polycarboxylic acid or esterifiable derivative thereof, with a polyol-containing component.

Also, the polyester polyol is manufactured by ring-opening polymerization-reacting lactones using a polyol-containing component as an initiator.

The polyester polyol may be manufactured according to any known method.

When polycondensation-reacting a component containing a polycarboxylic acid or esterifiable derivative thereof with a polyol-containing component, or ring-opening polymerization-reacting lactones using a polyol-containing component as an initiator, any known reaction catalyst may be used as necessary.

The polyester polyol may be manufactured in the presence of a small quantity of an appropriate solvent acting as an entraining agent. For the entraining agent, an aromatic hydrocarbon, aliphatic (alicyclic) hydrocarbon, etc., is used, such as xylene, cyclohexane, or methyl cyclohexane, for example.

—Components Other Than Polyester Polyol—

The polyester polyol-containing polyol component used for obtaining the polyester-based polyurethane may contain, in addition to the aforementioned polyester polyol, an active hydrogen compound other than polyester polyol by a quantity no more than 50% by mol of the polyol component.

The active hydrogen compound may comprise one or two or more types of active hydrogen compounds selected from among, for example, polyol, polyamine, and polycarboxylic acid.

The polyol component may comprise one or two or more types of polyols selected from among, for example, the polyol used in the manufacturing of the polyester polyol, as well as polymer polyols and other polyols.

Among the polymer polyols, one or two or more types may be selected from among, for example, polyester polyols (such as poly(oxyethylene) glycol, poly(oxypropylene) glycol, poly(oxybutylene) glycol, polytetramethylene glycol, poly(oxyethylene/oxypropylene) glycol, poly(oxyethylene/tetramethylene) glycol, etc.), polycarbonate polyols, acryl polyols, polyurethane polyols, polybutadiene polyols, and hydrogenated polybutadiene polyols, each having a weight average molecular weight of 400 to 10,000.

Among the other polyols, one or two or more types may be selected from among, for example, glycerin, 2-methyl-2-hydroxymethyl-1,3-propanediol, 2,4-dihydroxy-3-hydroxymethyl pentane, 1,2,6-hexanetriol, trimethylolpropane, 2,2-bis(hydroxymethyl)-3-butanol, aliphatic triols having 8 to 24 carbon atoms, tetramethylolmethane, D-sorbitol, xylitol, D-mannitol, silicone polyols, castor oil-based polyols, and alkylene oxide low-mol adducts of these polyols.

The polyamine component may comprise one or two or more types of components selected from among, for example, ethylenediamine, propylenediamine, hexamethylenediamine, hydrazine, 1,2-diaminoethane, 1,2-diaminopropane, 1,3-diaminopentane, 1,6-diaminohexane, diaminotoluene, bis-(4-aminophenyl)methane, bis-(4-amino-3-chlorophenyl)methane, diethylenetriamine, triethylenetetramine, tetraethylenepentamine, pentaethylenehexamine, and 2,2'-diaminodiethylamine.

(Polyisocyanate Compound)

The polyisocyanate component may be of any type so long as it is a compound having at least two isocyanate groups or derivative thereof. Examples include diisocyanate and triisocyanate, where diisocyanate is particularly preferred.

The polyisocyanate component may comprise one or two or more types of components selected from among aliphatic polyisocyanates, alicyclic polyisocyanates, aromatic polyisocyanates, aromatic-aliphatic polyisocyanates, and aromatic-alicyclic polyisocyanates.

The polyisocyanate component may be one that has been blocked with a blocking agent.

The derivative of polyisocyanate component may be a multimerized product/modified product (adductized product, carbodiimidized product, allophanate product, uretdione product, isocyanurate product, biuret product, uretoimine product, dimer, trimer, pentamer, heptamer, etc.).

Among the aliphatic polyisocyanates, one or two or more types may be selected from among, for example, ethylene diisocyanate, trimethylene diisocyanate, tetramethylene diisocyanate, pentamethylene diisocyanate, 1,6-hexamethylene diisocyanate (HDI), ethyl ethylene diisocyanate, heptamethylene diisocyanate, dodecamethylene diisocyanate, 1,6,11-undecane triisocyanate, 2,2,4-trimethyl hexamethylene diisocyanate, 2,4,4-trimethyl hexamethylene diisocyanate, lysin diisocyanate (2,6-diisocyanatomethyl caproate), bis(2-isocyanatoethyl) fumarate, bis(2-isocyanatoethyl) carbonate, and 2-isocyanatoethyl-2,6-diisocyanatohexanoate.

Among the alicyclic polyisocyanates, one or two or more types may be selected from among, for example, isophorone diisocyanate (IPDI), 4,4'-dicyclohexylmethane diisocyanate (hydrogenated MDI), hydrogenated xylylene diisocyanate, hydrogenated toluene diisocyanate, cyclobutane diisocyanate, cyclopentane diisocyanate, 1,4-cyclohexane diisocyanate, 1,3-cyclohexane diisocyanate, methyl cyclohexylene diisocyanate, bis(2-isocyanatoethyl)-4-cyclohexene-1,2-dicarboxylate, 2,5-norbornane diisocyanate, 2,6-norbornane diisocyanate, and 2-heptyl-3,4-bis(9-isocyanatononyl)-1-pentyl-cyclohexane.

Among the aromatic polyisocyanates, one or two or more types may be selected from among, for example, 2,4-tolylene diisocyanate, 2,6-tolylene diisocyanate, 4,4'-diphenylmethane diisocyanate, p-phenylene diisocyanate, m-phenylene diisocyanate, 1,5-naphtylene diisocyanate, 3,3'-dimethyl diphenyl-4,4'-diisocyanate, dianisidine diisocyanate, 4,4'-toluidine diisocyanate, 4,4'-diphenyl ether diisocyanate, triphenylmethane triisocyanate, 1,3,5-triisocyanatobenzene, 2,4,6-triisocyanatotoluene, dimethyl triphenylmethane tetraisocyanate, polymethylene polyphenyl polyisocyanate (crude MDI, polymeric MDI), and crude tolylene diisocyanate (crude TDI).

Among the aromatic-aliphatic polyisocyanates, one or two or more types may be selected from among, for example, 1,3-xylylene diisocyanate, 1,4-xylylene diisocyanate, and tetramethyl xylylene diisocyanate.

Preferably among these polyisocyanates, one or two or more types are selected from among tolylene diisocyanate, diphenylmethane diisocyanate, polymethylene polyphenylene polyisocyanate, hexamethylene diisocyanate, and xylylene diisocyanate.

(Chain Extender)

For the chain extender to be used as necessary, any chain extender traditionally used in polyurethane manufacturing can be used, which may comprise one or two or more types of active hydrogen compounds each having, in its molecule, at least two active hydrogen atoms that can react with isocyanate groups.

The chain extender may comprise one or two or more types of compounds including, for example, polyamine compounds, amino alcohol compounds, aminocarboxylic acid compounds, and polyol compounds.

The chain extender has, in its molecule, at least two active hydrogens that can react with the terminal isocyanate groups of a urethane prepolymer, and thus can react with the urethane prepolymer terminals to produce a polyurethane resin of high molecular weight.

Among the polyamine compounds that are compounds having at least two amino groups, one or two or more types may be selected from among, for example, ethylenediamine, 1,3-propanediamine, 1,4-butanediamine, 1,6-hexamethylenediamine, 1,4-cyclohexanediamine, 1,4-cyclohexyldimethylamine, trimethylhexamethylenediamine, 3-aminomethyl-3,5,5-trimethylcyclohexylamine, piperazine, 2,5-dimethylpiperazine, isophoronediamine, 4,4'-diaminodicyclohexylmethane, norbornanediamine, diethylenetriamine, phenylenediamine, triethylenetriamine, 1,3-bis(aminomethyl) cyclohexane, xylylenediamine, toluenediamine, diethylenetriamine, triethylenetetramine, hydrazine, adipic acid dihydrazide, isophthalic acid dihydrazide, dipropylenetriamine, and dibutylenetriamine.

Each polyamine compound may be in a masked compound form, such as ketimine, ketazine, or amine salt.

Among the amino alcohol compounds that are compounds having amino groups and hydroxyl groups, one or two or more types may be selected from among, for example, hydroxyethylhydrazine, hydroxy ethyl diethylenetriamine, N-(2-aminoethyl)ethanolamine, 3-aminopropanediol, ethanolamine, diethanolamine, 2-amino-2-methylpropanol, aminoethyl alcohol, aminopropyl alcohol, and triethanolamine.

Among the aminocarboxylic acid compounds that are compounds having amino groups and carboxyl groups, one or two or more types may be selected from among, for example, glycine, alanine, valine, lysine, and arginine.

Among the polyol compounds that are compounds having at least two hydroxyl groups, one or two or more types may be selected from among, for example, ethylene glycol, diethylene glycol, triethylene glycol, 1,2-propanediol, 1,3-propanediol, 1,4-butanediol, 1,2-butylene glycol, 1,6-hexanediol, trimethylolpropane, 1,4-bis($\beta$-hydroxyethoxy) benzene, 1,4-cyclohexanediol, bis-($\beta$-hydroxyethyl) terephthalate, xylylene glycol, pentaerythritol, castor oil or hardened castor oil, dimethylolpropane ether, 1,2-cyclohexanediol, 1,4-cyclohexanedimethanol, bisphenol A, bisphenol F, neopentyl glycol, hydroxypivalic acid-neopentyl glycol ester, hydroxylated bisphenol A, hydroxypropylated bisphenol A, and hydrogenated bisphenol A.

As for the use quantity of the chain extender, the isocyanate group equivalent of the polyisocyanate component (isocyanate terminal prepolymer) relative to the active hydrogen groups in the chain extender (isocyanate groups/active hydrogen groups) may be 0.8 to 4.0 equivalent, or preferably 1.0 to 2.0 equivalent, for example.

(Urethanization Catalyst)

To accelerate the urethanization reaction, any known urethanization reaction catalyst may be used, as necessary.

The catalyst may comprise one or two or more types of catalysts selected from among, for example, triethylamine, N-ethyl morpholine, triethylenediamine, cycloamidines (1,8-diaza-bicyclo(5,4,0)undecene-7 (DBU)) and other amine-based catalysts, dibutyltin dilaurate, dioctyltin dilaurate, tin octylate and other tin-based catalysts, tetrabutyl titanate and other titanium-based catalysts, and bismuth trioctylate and other bismuth-based catalysts.

The use quantity of the urethanization catalyst may be 1% by mass or lower, or preferably 0.05% by mass or lower, or more preferably 0.01% by mass or lower, relative to the total mass of the polyol component, polyisocyanate component, chain extender, and chain stopper.

(Chain Stopper)

In the urethanization reaction, a chain stopper may be used to stop the reaction, as necessary.

The chain stopper may comprise one or two or more types of chain stoppers selected from among, for example, methanol, ethanol, isopropanol, cellosolves, carbitols, monomethylamine, monoethylamine, monobutylamine, dibutylamine, monooctylamine, and other mono- or di-alkylamines, monoethanolamine, diethanolamine, diisopropanolamine, hexyl isocyanate, nonyl isocyanate, lauryl isocyanate, stearyl isocyanate, and phenol isocyanate.

As for the use quantity of the chain stopper, the equivalent ratio of the isocyanate groups remaining in the chain stopping process relative to the active hydrogen groups in the chain stopper (isocyanate groups/active hydrogen groups) may be 0.8 to 1.2, or preferably 0.9 to 1.1, for example.

(Method for Manufacturing Polyester-Based Polyurethane)

The polyester-based polyurethane having a polyester skeleton in its molecule can be obtained by using any known method to cause a polyol component containing a polyester skeleton in its molecule to react with a polyisocyanate component, along with a chain extender, chain stopper, etc., that may be used as necessary, using an urethanization catalyst, as necessary.

For example, one method is to react a polyol component with a polyisocyanate component under a condition where there are excess active hydrogen groups relative to isocyanate groups in mols.

This may be done according to the bulk polymerization, solution polymerization, or other known polymerization method, using the aforementioned urethanization catalyst as necessary, by compounding the polyol component with the polyisocyanate component at a ratio where the equivalent ratio of isocyanate groups to active hydrogen groups (isocyanate groups/active hydrogen groups) does not exceed 1, or preferably falls between 0.95 and 0.5, followed by, if necessary, removal of unreacted components by any known removal means.

Also, for example, reacting a polyol component with a polyisocyanate component under a condition where there are excess isocyanate groups relative to active hydrogen groups in mols, to synthesize an isocyanate terminal prepolymer, and then reacting a chain extender or chain stopper with it, is another method.

In this case, an isocyanate terminal prepolymer may be synthesized according to the bulk polymerization, solution polymerization, or other known polymerization method, using the aforementioned urethanization catalyst as necessary, by compounding the polyol component with the polyisocyanate component at a ratio where the equivalent ratio of isocyanate groups to active hydrogen groups (isocyanate groups/active hydrogen groups) exceeds 1, or preferably falls between 1.05 and 2.0, followed by, if necessary, removal of unreacted components by any known removal means.

Preferably the content of isocyanate groups in the obtained isocyanate terminal prepolymer is in a range of 0.1 to 5.0% by mass, or better yet 0.5 to 3.0% by mass.

Thereafter, the obtained isocyanate terminal prepolymer is reacted with the chain extender at a ratio where the equivalent ratio of the isocyanate groups in the isocyanate terminal prepolymer relative to the active hydrogen groups in the chain extender (isocyanate groups/active hydrogen groups) is lower than 1, to extend the chain and stop the chain, or the chain stopper is directly reacted with the remaining isocyanate groups in the isocyanate terminal prepolymer to stop the chain, or alternately the isocyanate terminal prepolymer and chain extender are reacted together at a ratio where the aforementioned equivalent ratio exceeds 1, to extend the chain, and then the remaining isocyanate groups are further reacted with the chain stopper to stop the chain, to obtain the polyester-based polyurethane.

(Manufacturing of Polyester-Based Polyurethane Emulsion)

Because the polyester-based polyurethane constituting the polyester-based polyurethane emulsion disperses in an aqueous medium, preferably ionic functional groups and/or nonionic functional groups, which are hydrophilic groups, have been introduced into its molecule.

When hydrophilic groups are introduced into the molecule of the polyester-based polyurethane, hydrophilicity can be added to the polyester-based polyurethane and the polyester-based polyurethane can be dispersed in water.

If the polyester-based polyurethane has ionic functional groups, it can be dispersed in water and emulsified using a neutralizer of sufficient quantity to neutralize at least some of the ionic functional groups, such as a neutralizer of a quantity corresponding to 0.5 to 0.9 equivalent per 1 equivalent of ionic functional groups.

The ionic functional groups may be anionic functional groups or cationic functional groups.

The anionic functional groups may be, for example, carboxylic acid groups, sulfonic acid groups, phosphonic acid groups, or salts thereof, or preferably carboxylic acid groups or carboxylic acid bases. The salts include, for example, alkali metal salts, ammonium salts, and salts of trimethylamine, triethylamine, tributylamine, dimethylaniline, diethylaniline, triphenylamine, dimethylethanolamine, diethylethanolamine, methyldiethanolamine, triethanolamine, etc.

The cationic functional groups may be, for example, primary to tertiary amino groups, quaternary ammonium groups, tertiary sulfonium groups, quaternary phosphonium groups, or salts thereof, or preferably quaternary ammonium groups or tertiary sulfonium groups.

The salts include salts of inorganic acids and organic acids, such as sulfuric acid, hydrochloric acid, nitric acid, phosphoric acid, formic acid, acetic acid, lactic acid, dimethylol propionic acid, citric acid, etc.

The nonionic functional groups include, for example, polyoxyethylene groups and other polyoxyalkylene groups. Preferably the nonionic functional groups are introduced into the polyester-based polyurethane molecule as side chains or terminal groups.

The methods for introducing ionic functional groups and/or nonionic functional groups into the polyester-based polyurethane include, for example: a method of using, as the component to react with the polyisocyanate component, one containing an active hydrogen compound having at least one ionic functional group and/or nonionic functional group; a method of using, as the chain extender or chain stopper, one containing an active hydrogen compound having at least one ionic functional group and/or nonionic functional group; and so on.

The active hydrogen compound having anionic functional groups as ionic functional groups may comprise one or two or more types of compounds selected from among, for example, glyceric acid, dioxymaleic acid, dihydroxypropionic acid, dihydroxysuccinic acid, dioxyfumaric acid, tartaric acid, dimethylol propionic acid, 2,2-dimethylol acetic acid, dimethylol butanoic acid, 2,2-dimethylol pentanoic acid, 2,2-dimethylol heptanoic acid, 2,2-dimethylol octanoic acid, dimethylol nonanoic acid, 2,2-dimethylol lactic acid, 4,4-di(hydroxyphenyl) valeric acid, 4,4-di(hydroxyphenyl) butyric acid, dihydroxybenzoic acid, 1,3-phenylenediamine-4,6-disulfonic acid, 2,4-diaminotoluene-5-sulfonic acid, diaminovaleric acid, 3,4-diaminobenzoic acid, 2,4-diaminodiphenyl ether sulfonic acid, and 1,4-butanediol-2-sulfonic acid.

Anionic functional groups can be introduced into the polyester-based polyurethane by using these compounds.

The active hydrogen compound having cationic functional groups as ionic functional groups may comprise one or two or more types of compounds selected from among, for example, 2,2-dimethylol ethylamine, 2,2-dimethylol propylamine, N,N-dimethyl-2,2-dimethylol ethylamine, N,N-diethyl-2,2-dimethylol ethylamine, N-methyl-N-ethyl-2,2-dimethylol ethylamine, N,N-dimethyl-2,2-dimethylol propylamine, N,N-diethyl-2,2-dimethylol propylamine, and N-methyl-N-ethyl-2,2-dimethylol propylamine.

These compounds may have been blocked with an appropriate compound, as necessary.

Cationic functional groups can be introduced into the polyester-based polyurethane by using these compounds.

The active hydrogen compound having polyoxyalkylene groups as nonionic functional groups may comprise one or two or more types of compounds selected from among, for example, polyethylene glycol and polypropylene glycol.

Nonionic functional groups can be introduced into the polyester-based polyurethane by using these compounds.

The neutralizer used as necessary to disperse the polyester-based polyurethane in water is not limited in any way, and any known acid or base may be used.

Preferably the additive quantity of such neutralizer is 0.4 to 1.2 equivalent, or better yet 0.6 to 1.0 equivalent, per 1 equivalent of anionic functional groups or cationic functional groups.

The neutralizer used for the polyester-based polyurethane having anionic functional groups may comprise one or two or more types of bases selected from among, for example, ammonia, methylamine, ethylamine, dimethylamine, diethylamine, dipropylamine, trimethylamine, triethylamine, tri-n-propylamine, tributylamine, monoethanolamine, diethanolamine, triethanolamine, aminoethyl propanol, triisopropanolamine, triethylenediamine, dimethylaminoethanol, diisopropylethanolamine, dibutylethanolamine, methyldiethanolamine, morpholine, sodium hydroxide, potassium hydroxide, and lithium hydroxide.

The neutralizer used for the polyester-based polyurethane having cationic groups may comprise one or two or more types of acids, such as inorganic acids and organic acids, selected from among, for example, sulfuric acid, hydrochloric acid, nitric acid, phosphoric acid, formic acid, acetic acid, lactic acid, dimethylol propionic acid, and citric acid.

For the method for dispersing the polyester-based polyurethane in water, any known method may be adopted.

For example, the polyester-based polyurethane emulsion may be obtained by producing a polyurethane having hydrophilic groups in acetone or other organic solvent, and then adding water to perform phase-inversion emulsification, followed by a solvent removal method whereby the organic solvent is removed by distillation.

For example, the polyester-based polyurethane emulsion may be obtained by adding water to an isocyanate terminal polyurethane having hydrophilic groups to perform phase-inversion emulsification, followed by a prepolymer method whereby the molecular weight is increased using water or a chain extender.

For example, the polyester-based polyurethane emulsion may be obtained in water-dispersed state by adding water to an isocyanate terminal prepolymer obtained by reacting a polyol component with a polyisocyanate component under a condition where the equivalent ratio of isocyanate groups relative to active hydrogen groups (isocyanate groups/active hydrogen groups) exceeds 1, to disperse the isocyanate terminal prepolymer in water, and then compounding (dripping) a chain extender or chain stopper at a temperature of 30° C. or below to react the isocyanate terminal prepolymer with the chain extender or chain stopper in water, followed by agitation to complete the reaction at normal temperature, and, if necessary, heating under an appropriate temperature condition at reduced pressure, to remove the organic solvent and allow the isocyanate terminal prepolymer chain to extend or stop due to the chain extender or chain stopper.

The polyester-based polyurethane emulsion may be an emulsion obtained by dispersing the polyester-based polyurethane in water by mixing it with an emulsifier.

The emulsifier may comprise one or two or more types of emulsifiers selected from among anionic surface-active agents, cationic surface-active agents, nonionic surface-active agents, amphoteric surface-active agents, and polymeric emulsification dispersants.

(Commercially Available Polyester-Based Polyurethane Emulsion)

Among the commercially available polyester-based polyurethane emulsions, one or two or more types of products may be selected from among, for example, NeoRez R9330, NeoRez R9679, NeoRez R9637, and NeoRez R972 manufactured by Koninklijke DSM N.V., Impranil DLS and Baybond PU407 manufactured by Sumika Covestro Urethane Co., Ltd., HYDRAN ADS-110, HYDRAN ADS-120, HYDRAN HW-311, HYDRAN HW-350, HYDRAN AP-20, HYDRAN AP-40, HYDRAN APX-101H, and HYDRAN APX-110 manufactured by DIC Corporation, SUPERFLEX 128, SUPERFLEX 150, SUPERFLEX 150HS, SUPERFLEX 170, SUPERFLEX 210, SUPERFLEX 300, SUPERFLEX 500M, SUPERFLEX 620, SUPERFLEX 740, SUPERFLEX 820, SUPERFLEX 830HS, SUPERFLEX 860, and SUPERFLEX E-2000 manufactured by DKS Co., Ltd., TAKELAC W-6010, TAKELAC W-6020, TAKELAC W-511, TAKELAC WS-6021, and TAKELAC WS-5000 manufactured by Mitsui Chemicals, Inc., and WEM-200U and WBR-2122C manufactured by Taisei Fine Chemical Co., Ltd.

The lower limit of the content of polyester-based polyurethane emulsion is 0.1% by mass or higher, or preferably 0.5% by mass or higher, or more preferably 1% by mass or higher, in equivalent resin solids content of polyester-based polyurethane in the aqueous primer composition, for example. Also, the upper limit of the content of polyester-based polyurethane emulsion is 25% by mass or lower, or preferably 20% by mass or lower, or more preferably 15% by mass or lower, in equivalent resin solids content of polyester-based polyurethane in the aqueous primer composition, for example.

The content of polyester-based polyurethane emulsion is 0.1 to 25% by mass, or preferably 0.5 to 20% by mass, or more preferably 1 to 15% by mass, in equivalent resin solids content of polyester-based polyurethane in the aqueous primer composition, for example.

If the content of polyester-based polyurethane is lower than 0.1% by mass in equivalent resin solids content of polyester-based polyurethane in the aqueous primer composition, lower lamination suitability may result when a printing layer is formed by printing images, text, etc., using inkjet recording ink compositions on a primer layer constituted by the aqueous primer composition.

If the content of polyester-based polyurethane exceeds 25% by mass in equivalent resin solids content of polyester-based polyurethane in the aqueous primer composition, the preservation stability of the aqueous primer composition may deteriorate.

<Water>

The aqueous primer composition contains water.

The water may be distilled water, ion-exchanged water, or other type of water normally used in the chemical field.

The quantity of water is not limited in any way. Its quantity may be equal to the remainder of the entire aqueous primer composition representing 100% by mass, less the solids content (in % by mass) of water-soluble multivalent metal salt, resin solids content (in % by mass) of polyester-based polyurethane emulsion, and solids content (in % by mass) of arbitrary components.

<Arbitrary Components>

The aqueous primer composition may have arbitrary components compounded in it as necessary, other than the water-soluble multivalent metal salt, polyester-based polyurethane emulsion, and water, to the extent that the object of the present invention is not impaired.

One or two or more types of arbitrary components may be selected from among various additives such as surface-active agent, emulsion other than the polyester-based polyurethane emulsion, water-soluble organic solvent, adhesion imparting agent, defoaming agent, storability-improving agent, colorant, leveling agent, filler, and thickening agent.

(Surface-Active Agent)

The aqueous primer composition may contain one or two or more types of surface-active agents selected from among cationic surface-active agents, anionic surface-active agents, nonionic surface-active agents, and amphoteric surface-active agents.

One or two or more types of surface-active agents may be selected from among, for example, acetylenediol-based surface-active agents, silicone-based surface-active agents, and fluorine-based surface-active agents.

Under the present invention, preferably acetylenediol-based surface-active agents are used.

Among the acetylenediol-based surface-active agents, one or two or more types may be selected from among, for example, those commercially available under the product names of SURFYNOL 104E, SURFYNOL 104H, SURFYNOL 104A, SURFYNOL 104BC, SURFYNOL 104DPM, SURFYNOL 104PA, SURFYNOL 104PG-50, SURFYNOL 420, and SURFYNOL 440 manufactured by Air Products and Chemicals, Inc., and OLFINE E1004, OLFINE E1010, OLFINE E1020, OLFINE PD-001, OLFINE PD-002W, OLFINE PD-004, OLFINE PD-005, OLFINE EXP.4001, OLFINE EXP.4200, OLFINE EXP.4123, and OLFINE EXP.4300 manufactured by Nissin Chemical Co., Ltd.

The content of surface-active agent is 0 to 1.0% by mass, or preferably 0.01 to 1.0% by mass, or more preferably 0.1 to 0.7% by mass, relative to the entire aqueous primer composition, for example.

(Emulsion Other than Polyester-Based Polyurethane Emulsion)

The aqueous primer composition may contain one or two or more types of emulsions other than the polyester-based polyurethane emulsion.

For such emulsion(s), one or two or more types may be selected from among, for example, acrylic-based resin emulsions (such as acrylic emulsion, styrene-acrylic-based emulsion, acrylic-vinyl acetate-based emulsion, acrylic-vinyl chloride-based emulsion, acrylic-silicone-based emulsion, acrylic-colloidal silica-based emulsion, etc.), polyester-based resin emulsions, polyurethane-based resin emulsions, polyvinyl acetate-based resin emulsions (such as vinyl acetate homopolymer emulsion, ethylene-vinyl acetate-based emulsion, propylene-vinyl acetate-based emulsion, vinyl chloride-vinyl acetate-based emulsion, vinylidene chloride-vinyl acetate-based emulsion, vinyl fluoride-vinyl acetate-based emulsion, alkyl (meth)acrylate ester-vinyl acetate-based emulsion, (meth)acrylic acid-vinyl acetate-based emulsion, maleic acid-vinyl acetate-based emulsion, fumaric acid-vinyl acetate-based emulsion, crotonic acid-vinyl acetate-based emulsion, and partially or completely saponified products thereof, etc.), polyvinyl chloride-based resin emulsions, polybutadiene-based resin emulsions, polyethylene-based resin emulsions, chlorinated polyolefin-based resin emulsions (such as resin emulsions obtained by chlorinating one or two or more types selected from among polyethylene, crystalline polypropylene, amorphous polypropylene, ethylene-propylene copolymer, ethylene-propylene-diene copolymer, ethylene-propylene-α-olefin copolymer, propylene-α-olefin copolymer, ethylene-vinyl acetate copolymer, and α,β-unsaturated carboxylic acids thereof and/or derivative-modified products thereof, etc.).

The weight average molecular weights of resins contained in the emulsions other than the polyester-based polyurethane emulsion are 3,000 to 200,000, or preferably 3,000 to 100,000, for example.

The glass transition temperatures of resins contained in the emulsions other than the polyester-based polyurethane emulsion are −30 to 120° C., or preferably −10 to 80° C., for example.

The acid values of resins contained in the emulsions other than the polyester-based polyurethane emulsion are 10 to 500 mgKOH/g, or preferably 30 to 300 mgKOH/g, for example.

The emulsion content other than the polyester-based polyurethane emulsion is 0 to 20% by mass, or preferably 0.1 to 15.0% by mass, or more preferably 0.5 to 10.0% by mass, in equivalent resin solids content in the aqueous primer composition, for example.

(Water-Soluble Organic Solvent)

The aqueous primer composition may contain one or two or more types of water-soluble organic solvents.

One or two or more types of water-soluble organic solvents may be selected from among, for example, alcohols, alkyl ethers of polyalcohols, ketones, ethers, esters, and nitrogen-containing compounds.

Among the alcohols, one or two or more types may be selected from among, for example, methanol, ethanol, 1-propanol, 1-butanol, 1-pentanol, 1-hexanol, 1-heptanol, 1-octanol, 1-nonanol, 1-decanol, cyclopentanol, cyclohexanol, ethylene glycol, diethylene glycol, triethylene glycol, propylene glycol, dipropylene glycol, tripropylene glycol, butanediol, 1,5-pentanediol, 1,2-pentanediol, 1,6-hexanediol, 1,2-cyclohexanediol, heptanediol, octanediol, 1,9-nonanediol, 1,10-decanediol, tetraethylene glycol, polyethylene glycol, tetrapropylene glycol, thiodiglycol, and glycerin.

Among the alkyl ethers of polyalcohols, one or two or more types may be selected from among, for example, monoalkyl esters, monoalkyl ethers, and dialkyl ethers of the aforementioned alcohols.

Among the ketones, one or two or more types may be selected from among, for example, acetone, methylethyl ketone, methylbutyl ketone, methylisobutyl ketone, diisopropyl ketone, cyclopentanone, and cyclohexanone.

Among the ethers, one or two or more types may be selected from among, for example, isopropyl ether, n-butyl ether, tetrahydrofuran, tetrahydropyran, and 1,4-dioxane.

Among the esters, one or two or more types may be selected from among, for example, propylene carbonate, methyl acetate, ethyl acetate, propyl acetate, isopropyl acetate, n-butyl acetate, isobutyl acetate, amyl acetate, ethyl lactate, ethyl butyrate, dibutyl phthalate, dioctyl phthalate, and ε-caprolactone.

Among the nitrogen-containing compounds, one or two or more types may be selected from among, for example, pyrrolidone, N-methyl-2-pyrrolidone, ε-caprolactam, and octyl pyrrolidone.

The content of water-soluble organic solvent is 0 to 20.0% by mass, or preferably 0.1 to 15.0% by mass, or more preferably 0.5 to 10.0% by mass, in the aqueous primer composition, for example.

It should be noted that, from the viewpoint of drying property of the obtained primer layer, it is preferable not to use a water-soluble organic solvent.

(Adhesion Imparting Agent)

The aqueous primer composition may contain one or two or more types of adhesion-imparting agents.

Among the adhesion-imparting agents, one or two or more types of silane-coupling agents may be selected, for example.

Among the silane-coupling agents, one or two or more types may be selected from among, for example, 3-glycidoxypropyl trimethoxysilane, 3-glycidoxypropyl triethoxysilane, 2-(3,4-epoxycyclohexyl)ethyl trimethoxysilane, 2-(3,4-epoxycyclohexyl)ethylmethyl dimethoxysilane, vinyl trimethoxysilane, 3-methacryloxypropyl trimethoxysilane, 3-acryloxypropyl trimethoxysilane, vinylmethyl dimethoxysilane, methyl silicate, methyl trimethoxysilane, ethyl trimethoxysilane, butyl trimethoxysilane, octyl trimethoxysilane, dodecyl trimethoxysilane, phenyl trimethoxysilane, dimethyl dimethoxysilane, diethyl dimethoxysilane, dibutyl dimethoxysilane, diphenyl dimethoxysilane, trimethyl methoxysilane, triethyl methoxysilane, triphenyl methoxysilane, and 3-ureidopropyl triethoxysilane.

The content of adhesion imparting agent is 0 to 5.0% by mass, or preferably 0.5 to 3.0% by mass, or more preferably 0.5 to 1.0% by mass, in the aqueous primer composition, for example.

(Defoaming Agent)

The aqueous primer composition may contain one or two or more types of defoaming agents.

For the defoaming agent(s), any commercially available defoaming agent(s) may be used, and one or two or more types may be selected from among, for example, mineral oil-based nonionic surface-active agents, polydimethylsiloxane oils, ethylene oxide- or propylene oxide-modified dimethyl silicones, dimethyl silicone emulsions and other silicone-based defoaming agents, mineral oils, acetylene alcohols, and other alcohol-based defoaming agents, and Pluronic defoaming agents.

The content of defoaming agent is 0 to 1.0% by mass, or preferably 0.05 to 0.8% by mass, or more preferably 0.1 to 0.5% by mass, in the aqueous primer composition, for example.

(Storability-Improving Agent)

The aqueous primer composition may contain one or two or more types of storability-improving agents.

One or two or more types of storability-improving agents may be selected from among, for example, hindered amines, UV absorbents, and antioxidants.

Among the hindered amines, one or two or more types may be selected from among, for example, N—CH$_3$ types, N—H types, and N—OR types.

Among the UV absorbents, one or two or more types may be selected from among, for example, benzophenone-based UV absorbents, benzotriazole-based UV absorbents, salicylate-based UV absorbents, hydroxyphenyltriazine-based UV absorbents, cyanoacrylate-based UV absorbents, and nickel complex salt-based UV absorbents.

Among the antioxidants, one or two or more types may be selected from among, for example, phenol-based antioxidants, amine-based antioxidants, sulfur-based antioxidants, and phosphorus-based antioxidants.

The content of storability-improving agent is 0 to 1.0% by mass, or preferably 0.05 to 0.8% by mass, or more preferably 0.1 to 0.5% by mass, in the aqueous primer composition, for example.

(Colorant)

The aqueous primer composition may contain one or two or more types of colorants.

One or two or more types of colorants may be selected from among dyes and pigments, to give a desired color tone to the aqueous primer composition.

Among the dyes, one or two or more types may be selected from among, for example, Food Blue No. 1, Food Red No. 3, Food Red No. 102, Food Red No. 104, Food Red No. 105, Food Red No. 106, and Food Green No. 3.

These dyes can add application visibility to the aqueous primer composition, and will easily fade and become colorless under ultraviolet light from the sunlight, etc., after the primer is applied.

Among the pigments, one or two or more types may be selected from among known inorganic pigments and organic pigments traditionally used in inkjet recording ink compositions.

Among the inorganic pigments, one or two or more types may be selected from among, for example, carbon black, graphite, titanium oxide, zinc oxide, Tripon, black iron oxide, aluminum oxide, silicon dioxide, kaolinite, montmorillonite, talc, clay, barium sulfate, aluminum hydroxide, calcium carbonate, cadmium red, red iron oxide, molybdenum red, antimony red, chrome vermillion, molybdate orange, lead yellow, chrome yellow, cadmium yellow, yellow iron oxide, titanium yellow, chrome oxide, viridian, cobalt green, titanium cobalt green, cobalt chrome green, ultramarine, ultramarine blue, Prussian blue, cobalt blue, cerulean blue, manganese violet, cobalt violet, and mica.

Among the organic pigments, one or two or more types may be selected from among, for example, azo-based, azomethine-based, polyazo-based, phthalocyanine-based, quinacridone-based, anthraquinone-based, indigo-based, thioindigo-based, quinophthalone-based, benzimidazolone-based, isoindoline-based, and isoindolinone-based pigments.

When indicated by color index, one or two or more types may be selected from among, for example, Pigment Black 7, Pigment Blue 1, 2, 15, 15:1, 15:3, 15:4, 15:6, 16, 17, 60, Pigment Green 7, 36, Pigment Red 5, 7, 9, 12, 48, 49, 52, 53, 57, 57:1, 97, 122, 146, 149, 168, 177, 178, 179, 202, 206, 207, 209, 242, 254, 255, 282, Pigment Violet 19, 23, 29, 30, 37, 40, 50, Pigment Yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185, 213, and Pigment Orange 36, 43, 51, 55, 59, 61, 71, 74.

The content of colorant need only be a quantity that can give a desired color tone to the aqueous primer composition, such as 0 to 10.0% by mass, or preferably 0 to 5.0% by mass, or more preferably 0 to 3.0% by mass, in the aqueous primer composition, for example.

(Various Additives Such as Leveling Agent, Filler and Thickening Agent)

The aqueous primer composition may contain one or two or more types of various additives selected from among leveling agent, filler, and thickening agent.

The leveling agent may comprise one or two or more types of leveling agents selected from among, for example, those based on acrylic and silicone that are commercially available.

The filler may comprise one or two or more types of fillers selected from among, for example, calcium carbonate, silica, kaolin, clay, barium sulfate, and other extender pigments.

The thickening agent may comprise one or two or more types of thickening agents selected from among, for example, inorganic-based thickening agents (such as silica, clay, hectorite, etc.), polysaccharides and derivatives thereof (such as xanthan gum, carboxymethyl cellulose, hydroxyethyl cellulose, guar gum, etc.), and various polymers.

The various additives include various additives used in the fields of inks, coating materials, and primers.

The content of various additives such as leveling agent, filler, and thickening agent is 0 to 10.0% by mass, or preferably 0 to 5.0% by mass, or more preferably 0 to 3.0% by mass, in the aqueous primer composition, for example.

<Method for Manufacturing Aqueous Primer Composition>

The method for manufacturing the aqueous primer composition is not limited in any way.

For example, it may be manufactured according to one of the following methods, for example:
  (i) Add the water-soluble multivalent metal salt, polyester-based polyurethane emulsion, and if necessary, arbitrary components, to water, and then mix them under agitation using a Disper, etc.; or
  (ii) Mix under agitation using a Disper, etc., an aqueous solution of water-soluble multivalent metal salt containing the water-soluble multivalent metal salt, water, and if necessary, arbitrary components, and a solution containing the polyester-based polyurethane emulsion and, if necessary, arbitrary components.

<Application Target of Aqueous Primer Composition>

The aqueous primer composition may be used widely as a primer for metals, plastics, wood, paper, ceramics, and glass.

Among these, it may be used suitably for metals, plastics, glass, and other nonabsorbent materials, especially plastic films and other nonabsorbent media.

Among the nonabsorbent media, one or two or more types may be selected from among, for example, polyolefin films (biaxially oriented polypropylene film, polyethylene film, cyclic polyolefin film, etc.), polyester films (polyethylene terephthalate film, polybutylene terephthalate film, polylactic acid film, etc.), and nylon films.

[Ink Set]

The ink set in one embodiment of the present invention includes an aqueous primer composition and an inkjet recording ink composition.

<Aqueous Primer Composition>

The aqueous primer composition that makes up the ink set is constituted by the aqueous primer composition described in detail in the aforementioned embodiment.

The aqueous primer composition proposed by the present invention has excellent preservation stability. Also, when a primer layer constituted by this aqueous primer composition is provided on a plastic film or other nonabsorbent medium, the adhesion, bleeding property, water resistance, and lamination suitability of images printed with the inkjet recording ink composition can be improved.

<Inkjet Recording Ink Composition>

The inkjet recording ink composition is not limited in any way, and any known inkjet recording ink composition may be used.

Preferably the inkjet recording ink composition is an aqueous pigment-type inkjet recording ink composition for being highly safe, odor-free, and able to reduce VOCs.

The inkjet recording ink composition may be an aqueous pigment-type inkjet recording ink composition containing a resin emulsion, a pigment, a pigment dispersant, and a water-soluble organic solvent, for example.

From the viewpoint of discharge reliability, preferably it may be one containing a resin emulsion, a pigment, a pigment dispersant, a basic compound, a surface-active agent, a water-soluble organic solvent, and water.

(Resin Emulsion)

Preferably the resin emulsion contained in the inkjet recording ink composition is a resin emulsion whose resin has a glass transition temperature of 20° C. or lower.

The emulsion of a resin whose glass transition temperature is 20° C. or lower may comprise one or two or more types of emulsions selected from among, for example, acrylic-based resin emulsions, styrene-acrylic-based resin emulsions, polyester-based resin emulsions, polyurethane-based resin emulsions, polyvinyl acetate-based resin emulsions, polyvinyl chloride-based resin emulsions, polybutadiene-based resin emulsions, and polyolefin-based resin emulsions.

When a resin emulsion is used, the rub resistance of the obtained printed matter will improve. Also, when an emulsion of a resin whose glass transition temperature is 20° C. or lower is used, the obtained printed matter will have good coating film drying property and adhesion to the target recording medium constituted by a plastic film.

The lower limit of the content of resin emulsion is 1.0% by mass or higher, or preferably 2.0% by mass or higher, in equivalent solids content in the inkjet recording ink composition, for example.

Also, the upper limit of the content of resin emulsion is 10.0% by mass or lower, or preferably 5.0% by mass or lower, in equivalent solids content in the inkjet recording ink composition, for example.

If the content of resin emulsion is under 1.0% by mass in solids content, the appearance of the obtained printed matter may deteriorate and its various resistance properties may drop.

If the content of resin emulsion exceeds 10.0% by mass in solids content, ink discharge may become unstable.

Here, "glass transition temperature" refers to a theoretical glass transition temperature obtained by Wood's equation below:

$$1/Tg = W_1/Tg_1 + W_2/Tg_2 + W_3/Tg_3 + \ldots + W_x/Tg_x$$

(In the equation, $Tg_1$ to $Tg_x$ represent the glass transition temperatures of the homopolymers made up of monomers 1, 2, 3, . . . , x constituting the resin, respectively, $W_1$ to $W_x$ represent the polymerization fractions of monomers 1, 2, 3, . . . , x constituting the resin, respectively, and Tg represents the theoretical glass transition temperature. In Wood's equation, glass transition temperatures are absolute temperatures.)

(Pigment)

The pigment contained in the inkjet recording ink composition may comprise one or two or more types of pigments selected from among known inorganic pigments and organic pigments traditionally used in inkjet recording ink compositions.

Among the inorganic pigments, one or two or more types may be selected from among, for example, carbon black, graphite, titanium oxide, zinc oxide, Tripon, black iron oxide, aluminum oxide, silicon dioxide, kaolinite, montmorillonite, talc, clay, barium sulfate, aluminum hydroxide, calcium carbonate, cadmium red, red iron oxide, molybdenum red, antimony red, chrome vermillion, molybdate orange, lead yellow, chrome yellow, cadmium yellow, yellow iron oxide, titanium yellow, chrome oxide, viridian, cobalt green, titanium cobalt green, cobalt chrome green, ultramarine, ultramarine blue, Prussian blue, cobalt blue, cerulean blue, manganese violet, cobalt violet, and mica.

Among the organic pigments, one or two or more types may be selected from among, for example, azo-based, azomethine-based, polyazo-based, phthalocyanine-based, quinacridone-based, anthraquinone-based, indigo-based, thioindigo-based, quinophthalone-based, benzimidazolone-based, isoindoline-based, and isoindolinone-based pigments.

When indicated by color index, one or two or more types may be selected from among, for example, Pigment Black 7, Pigment Blue 1, 2, 15, 15:1, 15:3, 15:4, 15:6, 16, 17, 60, Pigment Green 7, 36, Pigment Red 5, 7, 9, 12, 48, 49, 52, 53, 57, 57:1, 97, 122, 146, 149, 168, 177, 178, 179, 202, 206, 207, 209, 242, 254, 255, 282, Pigment Violet 19, 23, 29, 30, 37, 40, 50, Pigment Yellow 12, 13, 14, 17, 20, 24, 74, 83, 86, 93, 94, 95, 109, 110, 117, 120, 125, 128, 137, 138, 139, 147, 148, 150, 151, 154, 155, 166, 168, 180, 185, 213, and Pigment Orange 36, 43, 51, 55, 59, 61, 71, 74.

These pigments may be alkali-soluble resin-coated pigments.

When alkali-soluble resin-coated pigments are used, the inkjet recording ink composition will have excellent preservation stability.

The method for manufacturing an alkali-soluble resin-coated pigment is not limited in any way.

For example, one method involves dispersing a pigment in an aqueous solution in which an alkali-soluble resin has been dissolved in the presence of a basic compound, and processing the obtained liquid dispersion by the acid precipitation method, ion exchange means, phase inversion emulsification method, etc., to cause the alkali-soluble resin to deposit on the pigment surface, followed by filtering out, washing in water, and if necessary, drying, the obtained deposit.

An alkali-soluble resin-coated pigment may be used by redispersing it in an aqueous medium using any of various dispersion machines after a basic compound needed to neutralize a part (such as 50 to 90%) of the acid radicals of the anionic groups in the alkali-soluble resin-coated pigment is added to the ink to neutralize the acid radicals.

For the alkali-soluble resin, a copolymer resin soluble in aqueous media in the presence of a basic compound, and used for pigment dispersion in standard inks and coating materials, may be utilized.

Examples include copolymers that are each obtained by copolymerizing a monomer having carboxyl groups, a monomer containing hydrophobic groups (such as hydrocarbon groups having 12 to 24 carbon atoms) to improve the pigment adsorption property, and if necessary, other polymerizable monomers.

The monomer having carboxyl groups may comprise one or two or more types of monomers selected from among, for example, acrylic acid, methacrylic acid, crotonic acid, itaconic acid, maleic acid, fumaric acid, 2-carboxyethyl (meth)acrylate, 2-carboxypropyl (meth)acrylate, maleic acid anhydride, monoalkyl maleate ester, citraconic acid, citraconic acid anhydride, and monoalkyl citraconate ester.

The monomer containing hydrophobic groups may comprise one or two or more types of monomers selected from among, for example, 2-ethylhexyl (meth)acrylate, octyl (meth)acrylate, lauryl (meth)acrylate, stearyl (meth)acrylate, 2-hydroxystearyl (meth)acrylate, dodecyl vinyl ether, vinyl 2-ethylhexanoate, vinyl laurate, vinyl stearate, cyclohexyl (meth)acrylate, benzyl (meth)acrylate, styrene, a-methyl styrene, and vinyl toluene.

The basic compound may comprise one or two or more types of compounds selected from among, for example, ammonia, methylamine, ethylamine, dimethylamine, diethylamine, dipropylamine, trimethylamine, triethylamine, tri-n-propylamine, tributylamine, monoethanolamine, diethanolamine, triethanolamine, aminoethyl propanol, triisopropanolamine, triethylenediamine, dimethylaminoethanol, diisopropylethanolamine, dibutylethanolamine, methyldiethanolamine, morpholine, sodium hydroxide, potassium hydroxide, and lithium hydroxide.

The acid value of the alkali-soluble resin is 40 to 300 mgKOH/g, or preferably 70 to 250 mgKOH/g, for example.

If the acid value of the alkali-soluble resin is under 40 mgKOH/g, the dispersion stability of the aqueous dispersion liquid of the alkali-soluble resin-coated pigment may drop.

If the acid value of the alkali-soluble resin exceeds 300 mgKOH/g, excessive hydrophilicity may cause the storage stability and water resistance to drop.

The weight average molecular weight of the alkali-soluble resin is 3,000 to 200,000, or preferably 7,000 to 100,000, for example.

If the weight average molecular weight of the alkali-soluble resin is under 3,000, the dispersion stability of the pigment or scratch resistance of the obtained printed matter may drop.

If the weight average molecular weight of the alkali-soluble resin exceeds 200,000, high viscosity may cause the ease of handling to drop.

The content of pigment, for an ink other than white ink, is 1.0 to 10.0% by mass, or preferably 2.0 to 7.0% by mass, relative to the total quantity of the inkjet recording ink composition.

A pigment use quantity of less than 1.0% by mass tends to result in insufficient coloring power, while a pigment use quantity of more than 10.0% by mass tends to cause the viscosity to rise and fluidity of the ink to drop.

For a white ink, the content of pigment is 5.0 to 15.0% by mass relative to the total quantity of the inkjet recording ink composition.

A white ink is lower in surface tension than inks of other colors, and thus can form a uniform layer when applied solidly over an image layer constituted by inks of other colors.

(Pigment Dispersant)

The pigment dispersant contained in the inkjet recording ink composition may be any known pigment dispersant used in inkjet recording ink compositions.

The pigment dispersant is a compound containing both groups having affinity to the pigment and groups having affinity to the solvent, etc.

Preferably the pigment dispersant is a resin, comprising one or two or more types of resins selected from among, for example, acrylic-based resins, styrene-acrylic-based resins, maleic acid-based resins, styrene-maleic acid-based resins, α-olefin-maleic acid-based resins, urethane-based resins, and ester-based resins.

For the resin constituting the pigment dispersant, a copolymer resin soluble in aqueous media in the presence of a basic compound, and used for pigment dispersion in standard inks and coating materials, may be utilized.

Examples include copolymers that are each obtained by copolymerizing a monomer having carboxyl groups, a monomer containing hydrophobic groups (such as hydrocarbon groups having 12 to 24 carbon atoms) to improve the pigment adsorption property, and if necessary, other polymerizable monomers.

The monomer having carboxyl groups may comprise one or two or more types of monomers selected from among, for example, acrylic acid, methacrylic acid, crotonic acid, itaconic acid, maleic acid, fumaric acid, 2-carboxyethyl (meth)acrylate, 2-carboxypropyl (meth)acrylate, maleic acid anhydride, monoalkyl maleate ester, citraconic acid, citraconic acid anhydride, and monoalkyl citraconate ester.

The monomer containing hydrophobic groups may comprise one or two or more types of monomers selected from among, for example, 2-ethylhexyl (meth)acrylate, octyl (meth)acrylate, lauryl (meth)acrylate, stearyl (meth)acrylate, 2-hydroxystearyl (meth)acrylate, dodecyl vinyl ether, vinyl 2-ethylhexanoate, vinyl laurate, vinyl stearate, cyclohexyl (meth)acrylate, benzyl (meth)acrylate, styrene, a-methyl styrene, and vinyl toluene.

From the viewpoint of stabilizing the pigment dispersant, preferably an acrylic-based resin, acrylic acid-lauryl acrylate-styrene copolymer, or other styrene-acrylic-based resin is used.

The acid value of the pigment dispersant is 40 to 300 mgKOH/g, or preferably 70 to 250 mgKOH/g, for example.

If the acid value of the pigment dispersant is under 40 mgKOH/g, the dispersion stability of the aqueous dispersion liquid of the pigment may drop.

If the acid value of the pigment dispersant exceeds 300 mgKOH/g, excessive hydrophilicity may cause the storage stability and water resistance to drop.

The weight average molecular weight of the pigment dispersant is 3,000 to 200,000, or preferably 7,000 to 100,000, for example.

If the weight average molecular weight of the pigment dispersant is under 3,000, the dispersion stability of the pigment or scratch resistance of the obtained printed matter may drop.

If the weight average molecular weight of the pigment dispersant exceeds 200,000, high viscosity may cause the ease of handling to drop.

(Basic Compound)

The basic compound that can be contained in the inkjet recording ink composition may be an inorganic compound or organic compound.

The basic compound may comprise one or two or more types of compounds selected from among, for example, ammonia, methylamine, ethylamine, dimethylamine, diethylamine, dipropylamine, trimethylamine, triethylamine, tri-n-propylamine, tributylamine, monoethanolamine, diethanolamine, triethanolamine, aminoethyl propanol, triisopropanolamine, triethylenediamine, dimethylaminoethanol, diisopropylethanolamine, dibutylethanolamine, methyldiethanolamine, morpholine, sodium hydroxide, potassium hydroxide, and lithium hydroxide.

The content of basic compound is 0.01 to 5.0% by mass, or preferably 0.1 to 1.0% by mass, relative to the total quantity of the inkjet recording ink composition, for example.

(Surface-Active Agent)

The surface-active agent that can be contained in the inkjet recording ink composition may be a cationic surface-active agent, anionic surface-active agent, nonionic surface-active agent, or amphoteric surface-active agent, such as any known surface-active agent traditionally used in inkjet recording ink compositions.

In the inkjet recording ink composition that makes up the ink set, it may comprise one or two or more types of surface-active agents selected from among, in particular, nonionic surface-active agents, such as acetylene glycol-based surface-active agents, silicone-based surface-active agents, and fluorine-based surface-active agents, among which acetylene glycol-based surface-active agents are preferred.

By using an acetylene diol-based surface-active agent(s), the inkjet recording ink composition can have good solid filling property for images printed (recorded) therewith.

Specific examples of acetylene diol-based surface-active agents include SURFYNOL 104E, SURFYNOL 104H, SURFYNOL 104A, SURFYNOL 104BC, SURFYNOL 104DPM, SURFYNOL 104PA, SURFYNOL 104PG-50, SURFYNOL 420, and SURFYNOL 440 manufactured by Air Products and Chemicals, Inc., and OLFINE E1004, OLFINE E1010, OLFINE E1020, OLFINE PD-001, OLFINE PD-002W, OLFINE PD-004, OLFINE PD-005, OLFINE EXP.4001, OLFINE EXP.4200, OLFINE EXP.4123, and OLFINE EXP.4300 manufactured by Nissin Chemical Co., Ltd., from which one or two or more types may be selected.

The content of surface-active agent (acetylene diol-based surface-active agent) is 0.01 to 5.0% by mass, or preferably 0.1 to 1.0% by mass, relative to the total quantity of the inkjet recording ink composition.

(Water-Soluble Organic Solvent)

The water-soluble organic solvent contained in the inkjet recording ink composition may comprise one or two or more types of water-soluble organic solvents selected from among, for examples, alcohols, alkyl ethers of polyalcohols, ketones, ethers, esters, and nitrogen-containing compounds.

Among the alcohols, one or two or more types may be selected from among, for example, methanol, ethanol, 1-propanol, 1-butanol, 1-pentanol, 1-hexanol, 1-heptanol, 1-octanol, 1-nonanol, 1-decanol, cyclopentanol, cyclohexanol, ethylene glycol, diethylene glycol, triethylene glycol, propylene glycol, dipropylene glycol, tripropylene glycol, butanediol, 1,5-pentanediol, 1,2-pentanediol, 1,6-hexanediol, 1,2-cyclohexanediol, heptanediol, octanediol, 1,9- nonanediol, 1,10-decanediol, triethylene glycol, tetraethylene glycol, polyethylene glycol, tetrapropylene glycol, thiodiglycol, and glycerin.

Among the alkyl ethers of polyalcohols, one or two or more types may be selected from among, for example, monoalkyl esters, monoalkyl ethers, and dialkyl ethers of the aforementioned alcohols.

Among the ketones, one or two or more types may be selected from among, for example, acetone, methylethyl ketone, methylbutyl ketone, methylisobutyl ketone, diisobutyl ketone, cyclopentanone, and cyclohexanone.

Among the ethers, one or two or more types may be selected from among, for example, isopropyl ether, n-butyl ether, tetrahydrofuran, tetrahydropyran, and 1,4-dioxane.

Among the esters, one or two or more types may be selected from among, for example, propylene carbonate, methyl acetate, ethyl acetate, propyl acetate, isopropyl acetate, n-butyl acetate, isobutyl acetate, amyl acetate, ethyl lactate, ethyl butyrate, dibutyl phthalate, dioctyl phthalate, and ε-caprolactone.

Among the nitrogen-containing compounds, one or two or more types may be selected from among, for example, pyrrolidone, N-methyl-2-pyrrolidone, ε-caprolactam, and octyl pyrrolidone.

The content of water-soluble organic solvent is 10.0 to 60.0% by mass, or preferably 20.0 to 50.0% by mass, in the inkjet recording ink composition, for example.

(Water)

The water that can be contained in the inkjet recording ink composition may be an ion-exchanged water or distilled water from which metal ions, etc., have been removed.

The content of water is not limited in any way. Its quantity may be equal to the remainder of the entire inkjet recording ink composition representing 100% by mass, less the resin solids content (in % by mass) of resin emulsion, solids content (in % by mass) of pigment, solids content (in % by mass) of pigment dispersant, content (in % by mass) of surface-active agent, content (in % by mass) of water-soluble organic solvent, and solids contents (in % by mass) of arbitrary components.

(Arbitrary Components)

The inkjet recording ink composition may, if necessary and to the extent that its effect is not impaired, contain one or two or more types of arbitrary components selected from among various additives such as other resins, antifungal agent, rustproof agent, thickening agent, storability improving agent, defoaming agent, pH adjuster, polyethylene wax, leveling agent, plasticizer, surface adjusting agent, etc.

Also, a hydrazine derivative having at least two hydrazine groups, such as adipic acid dihydrazide, etc., may be added. In this case, the adhesion of the coating film constituted by the inkjet recording ink composition can be improved by performing corona discharge treatment, plasma treatment, etc., on the film surface where hydroxyl groups or other polar groups have been formed, thereby causing reaction between the polar groups and the hydrazide groups.

—Other Resins—

As for other resins that may be contained in the inkjet recording ink composition, resins other than the aforementioned resin emulsion and pigment dispersant may be contained in emulsion or aqueous solution form.

Such resins include one or two or more types of resins selected from among, for example, acrylic-based resins, vinyl chloride-based resins, vinyl chloride-vinyl acetate-based resins, ethylene-vinyl acetate-based resins, styrene-acrylic-based resins, styrene-maleic acid-based resins, cellulose-based resins, and maleic acid-based resins.

The content of other resins is 0.5 to 5.0% by mass, or preferably 1.0 to 4.0% by mass, in equivalent solids content in the inkjet recording ink composition, for example.

A content of other resins under 0.5% by mass may cause bleeding due to insufficient fixability on the base material, while a content exceeding 5.0% by mass may cause the discharge stability to drop due to an excessive increase in solids content.

—Antifungal Agent—

The inkjet recording ink composition may contain one or two or more types of antifungal agents.

Antifungal agents include, for example, organic sulfur-based, organic nitrogen sulfur-based, organic halogen-based, haloaryl sulfone-based, iodopropargyl-based, N-haloalkylthio-based, benzothiazole-based, nitrile-based, pyridine-based, 8-oxyquinoline-based, isothiazoline-based, dithiol-based, pyridine oxide-based, nitropropane-based, organic tin-based, phenol-based, quaternary ammonium salt-based, triazine-based, thiadiazine-based, anilide-based, adamantane-based, dithiocarbamate-based, brominated indanone-based, benzyl bromoacetate-based, and inorganic salt-based antifungal agents, for example.

The content of antifungal agent is 0 to 1.0% by mass, or preferably 0.05 to 0.5% by mass, in the inkjet recording ink composition, for example.

—Rustproof Agent—

The inkjet recording ink composition may contain one or two or more types of rustproof agents.

Examples of rustproof agents include benzotriazole, etc.

The content of rustproof agent is 0 to 1.0% by mass, or preferably 0.05 to 0.5% by mass, in the inkjet recording ink composition, for example.

—Thickening Agent—

The inkjet recording ink composition may contain one or two or more types of thickening agents.

Among the thickening agents, one or two or more types may be selected from among, for example, inorganic-based thickening agents (such as silica, clay, hectorite, etc.), polysaccharides and derivatives thereof (such as xanthan gum, carboxymethyl cellulose, hydroxyethyl cellulose, guar gum, etc.), and various polymers.

The content of thickening agent is 0 to 1.0% by mass, or preferably 0.05 to 0.5% by mass, in the inkjet recording ink composition, for example.

—Storability Improving Agent—

The inkjet recording ink composition may contain one or two or more types of storability improving agents.

Among the storability improving agents, one or two or more types may be selected from among, for example, hindered amines (photostabilizers), UV absorbents, and antioxidants.

Among the hindered amines, one or two or more types may be selected from among, for example, N—$CH_3$ types, N—H types, and N—OR types.

Among the UV absorbents, one or two or more types may be selected from among, for example, benzophenone-based UV absorbents, benzotriazole-based UV absorbents, salicylate-based UV absorbents, hydroxyphenyl triazine-based UV absorbents, cyanoacrylate-based UV absorbents, p-aminobenzoate ester-based UV absorbents, oxalic anilide-based UV absorbents, and nickel complex salt-based UV absorbents.

Among the antioxidants, one or two or more types may be selected from among, for example, phenol-based antioxidants, amine-based antioxidants, sulfur-based antioxidants, and phosphorus-based antioxidants.

The content of storability improving agent is 0 to 1.0% by mass, or preferably 0.05 to 0.5% by mass, in the inkjet recording ink composition, for example.

—Defoaming Agent—

The inkjet recording ink composition may contain one or two or more types of defoaming agents.

Among the defoaming agents, for which any commercially available defoaming agents can be used, one or two or more types may be selected from among, for example, mineral oil-based nonionic surface-active agents, polydimethylsiloxane oils, ethylene oxide- or propylene oxide-modified dimethyl silicones, dimethyl silicone emulsions and other silicone-based defoaming agents, mineral oils, acetylene alcohols and other alcohol-based defoaming agents, and Pluronic-based defoaming agents.

The content of defoaming agent is 0 to 1.0% by mass, or preferably 0.05 to 0.5% by mass, in the inkjet recording ink composition, for example.

—pH Adjuster—

Among the pH adjusters, for which any substances having pH adjusting function may be used, one or two or more types may be selected from among, for example, sodium hydroxide, potassium hydroxide, lithium hydroxide, potassium dihydrogen phosphate, and disodium hydrogen phosphate.

The content of pH adjuster corresponds to a quantity that adjusts the inkjet recording ink composition to a desired pH.

—Polyethylene Wax—

The inkjet recording ink composition may contain a polyethylene wax.

The polyethylene wax has the effect of improving the blocking resistance of the printed matter.

The polyethylene wax may comprise one or two or more types of products selected from among, for example, "AQUACER507", "AQUACER515" and "AQUACER531" manufactured by BYK Japan KK, and "HYTEC E-6314" (solids content 35%, nonionic emulsified polyethylene wax, average grain size 100 nm), and "HYTEC E-1000" (solids content 35%, nonionic emulsified polyethylene wax, average grain size 140 nm) manufactured by TOHO Chemical Industry Co., Ltd.

The content of polyethylene wax is 0 to 10.0% by mass, or preferably 0 to 5.0% by mass, in the inkjet recording ink composition, for example.

—Various Additives Such as Leveling Agent, Plasticizer, and Surface-Adjusting Agent—

The inkjet recording ink composition may contain one or two or more types of additives selected from among known leveling agents, plasticizers, surface-adjusting agents and various other additives used in inkjet recording ink compositions.

Among the leveling agents, one or two or more types may be selected from among, for example, acrylic-based and silicone-based leveling agents that are commercially available.

The plasticizers, surface-adjusting agents, and various other additives include various additives used in the fields of inks, coating materials, and primers.

The content of various other additives such as leveling agent, plasticizer, and surface-adjusting agent is 0 to 10.0% by mass, or preferably 0 to 5.0% by mass, or more preferably 0 to 3.0% by mass, in the inkjet recording ink composition, for example.

(Manufacturing of Inkjet Recording Ink Composition)

The method for manufacturing the inkjet recording ink composition is not limited in any way.

For example, the inkjet recording ink composition may be obtained by adding a pigment and water to an aqueous varnish containing a pigment dispersion and a basic compound, and kneading the mixture to prepare a pigment ink base, and then mixing the pigment ink base with a water-soluble organic solvent, a resin emulsion, a surface-active agent, and water, followed by dispersion and mixing using a wet circulation mill, bead mill, ball mill, sand mill, attritor, roll mill, DCP mill, agitator, Henschel mixer, colloid mill, ultrasonic homogenizer, high-pressure homogenizer (Microfluidizer, Nanomizer, Ultimizer, Genus PY, DeBEE2000, etc.), pearl mill, Disper or other dispersion machine.

The obtained ink composition is adjusted to an initial viscosity of 2.0 to 10.0 mPa·s, for example.

The static surface tension of the ink composition is adjusted to 25 to 35 mN/m, for example.

The ink set may have inkjet recording ink compositions of respective colors. In addition to yellow, magenta, cyan, black, and white, the ink set may also have green, purple, etc., as well as lighter colors thereof, as necessary.

[Printed Matter]

The printed matter in an embodiment of the present invention is a printed matter comprising a base material layer, a primer layer containing an aqueous polyvalent metal salt and a polyester-based polyurethane, and a printing layer.

The printed matter proposed by the present invention may have, on the printing layer, an adhesive layer and a lamination layer, each provided as necessary.

<Base Material Layer>

The base material layer, for which any material may be used without limitation so long as it is commonly used for the production of printed matters, may comprise one or two or more types of materials selected from among, for example, metals, plastics, wood, paper, ceramics, and glass.

Among these, it may be used suitably for metals, plastics, glass, and other nonabsorbent materials, especially plastic films and other nonabsorbent media.

Among the nonabsorbent media, one or two or more types may be selected from among, for example, polyolefin films (biaxially oriented polypropylene film, polyethylene film, cyclic polyolefin film, etc.), polyester films (polyethylene terephthalate film, polybutylene terephthalate film, polylactic acid film, etc.), and nylon films.

<Primer Layer Containing Water-soluble Multivalent Metal Salt and Polyester-Based Polyurethane>

The primer layer containing water-soluble multivalent metal salt and polyester-based polyurethane is a layer formed by coating or inkjet-printing on the aforementioned base material layer the aforementioned aqueous primer composition representing an embodiment of the present invention.

The coating method is not limited in any way. Coating may be performed using any of various traditionally known coating machines. One example is to perform coating using a blade coater, air knife coater, roll coater, bar coater, gravure coater, rod blade coater, lip coater, curtain coater, die coater, or any of various other coating machines.

The dry film thickness of the primer layer is 0.01 to 1.0 µm, or preferably 0.05 to 0.8 µm, for example.

If the dry film thickness of the primer layer is under 0.01 µm, forming a flawless primer layer (primer coating film) evenly on a film may become difficult, leading to a deterioration in lamination suitability.

If the dry film thickness of the primer layer exceeds 1.0 µm, drying the primer layer may take time and the workability may drop, which can be economically inefficient because any improvement in adhesive property is negligent.

The inkjet printing method is not limited in any way. One example is to store the aqueous primer composition in an ink cartridge which is then installed in an inkjet recording device of single-pass or other type, and injected from a nozzle onto a target recording medium. At that point, the ejected aqueous primer composition is dried as deemed appropriate, and a primer layer is formed as a result.

<Printing Layer>

The printing layer is a layer formed with inkjet recording ink composition, etc., on the aforementioned primer layer on top of the aforementioned base material layer, for the purpose of forming images and text.

The printing layer is provided according to the steps below, for example.

Inkjet printing is performed with a desired machine on a primer layer provided over the entire surface on one side, or part thereof, of a resin film constituting a bag-shaped packaging container, etc., using a colored inkjet recording ink composition of any color other than white. To perform multi-color printing, the respective colors are inkjet-printed in a desired sequence.

Thereafter, a white inkjet recording ink composition is printed on the printing layer constituted by the colored inkjet recording ink composition(s), or on the entire surface, and then dried. Here, preferably the white inkjet recording ink composition has a lower surface tension than the ink composition(s) of other color(s) so that the white ink composition will achieve excellent solid printability. Also, a drying process may be inserted between the printings of different colors or between the printing of the colored ink(s) and the printing of the white ink.

<Laminate Layer>

Next, a resin film that will form the interior face side of the packaging container is laminated on the white inkjet recording ink composition layer, with an adhesive layer inserted in between as necessary.

The obtained laminate film is processed into a bag, etc., using a desired means.

EXAMPLES

The present invention is explained in greater detail below by citing examples; however, the present invention is not limited to these examples. It should be noted that, unless otherwise specified, "percent" refers to "percent by mass," while "part(s)" refers to "part(s) by mass."

Example 1

An aqueous primer composition was prepared by mixing calcium acetate by 0.1 parts by mass, polyester-based polyurethane emulsion 1 by 2 parts by mass in resin solids content, an acetylenediol-based surface-active agent, as surface-active agent, by 0.5 parts by mass, and water by a quantity that would bring the total to 100.0 parts by mass.

Examples 2 to 11

Aqueous primer compositions were prepared in the same manner as in Example 1, except that the various materials were compounded as shown in Table 1.

Comparative Examples 1 to 8

Aqueous primer compositions were prepared in the same manner as in Example 1, except that the various materials were compounded as shown in Table 1.

<Emulsions>

Polyester-based polyurethane emulsion 1: Impranil DLS (product name, manufactured by Sumika Covestro Urethane Co., Ltd.)

Polyester-based polyurethane emulsion 2: Baybond PU407 (product name, manufactured by Sumika Covestro Urethane Co., Ltd.)

Polyester-based polyurethane emulsion 3: NeoRez R9330 (product name, manufactured by Koninklijke DSM N. V.)

Polyether-based polyurethane emulsion: NeoRez R650 (product name, manufactured by Koninklijke DSM N. V.)

Polycarbonate-based polyurethane emulsion: NeoRez R986 (product name, manufactured by Koninklijke DSM N. V.)

Chlorinated polyolefin-based resin emulsion: SUPERCHLON E-604 (product name, manufactured by Nippon Paper Industries Co., Ltd.)

Polyvinyl acetate resin-based emulsion: VINYBLAN 1129 (product name, manufactured by Nissin Chemical Co., Ltd.)

Acrylic-based resin emulsion: VINYBLAN 2687 (product name, manufactured by Nissin Chemical Co., Ltd.)

<Surface-Active Agent>

Acetylenediol-based surface-active agent: OLFINE E1010 (active ingredient 100%, HLB13, product name, manufactured by Nissin Chemical Co., Ltd.)

[Preparation of Inkjet Recording Ink Composition]

<Aqueous Resin Varnish>

Twenty-five parts by mass of an acrylic acid/lauryl acrylate/benzyl methacrylate/styrene copolymer (glass transition temperature 40° C., weight average molecular weight 30,000, acid value 185 mgKOH/g) were dissolved in a mixture solution consisting of 3.9 parts by mass of potassium hydroxide and 71.1 parts by mass of water, to obtain an aqueous resin varnish of 25% by mass in solids content.

<Aqueous Black Ink Base>

To 32.0 parts by mass of the aforementioned aqueous resin varnish, 48.0 parts by mass of water were added and the two were mixed, to obtain a resin varnish for pigment dispersion.

To this varnish, 20.0 parts by mass of a carbon black (PRINTEX 90 (product name, manufactured by Orion Engineered Carbons S. A.)) were added and the two were mixed under agitation, after which the mixture was kneaded in a mill, to obtain an aqueous black ink base.

<Inkjet Recording Ink Composition>

The aforementioned aqueous black ink base, a propylene glycol, a styrene-acrylic-based emulsion (Neocryl A-1092 (product name, manufactured by DSM NeoResins, Inc.), glass transition temperature 6° C., solids content 48.5% by mass), a surface-active agent (OLFINE E1010), and water, were mixed under agitation to obtain an aqueous pigment-type inkjet recording ink composition.

[Physical Property/Performance Evaluation of Aqueous Primer Compositions]

<Preservation Stability>

The aqueous primer compositions in Examples 1 to 11 and Comparative Examples 1 to 8 were filled in glass vials and let stand stationary for seven days at 60° C., after which the aqueous primer compositions were observed for condition and separation/deposits or absence thereof, to evaluate preservation stability according to the evaluation criteria below. The results are also shown in Table 1.

○: Uniform, accompanied by no liquid phase separation or deposits.

Δ: There is some liquid phase separation and deposits.

x: Not uniform, accompanied by liquid phase separation and deposits.

<Bleeding>

(Base Material)

The following films were used:

Biaxially oriented polypropylene film that has been corona discharge-treated on one side (PYLEN Film P2161 (product name, manufactured by Toyobo Co., Ltd.), thickness 25 µm, hereinafter referred to as "OPP film")

Polyethylene terephthalate film that has been corona discharge-treated on one side (TOYOBO ESTER Film E5100 (product name, manufactured by Toyobo Co., Ltd.), thickness 12 µm, hereinafter referred to as "PET film")

Nylon film (PYLEN Film N1100 (product name, manufactured by Toyobo Co., Ltd.), thickness 15 µm)

(Formation of Primer Layers)

The aqueous primer compositions in Examples 1 to 11 and Comparative Examples 1 to 8 were each applied on the corona discharge-treated side of the OPP film, corona discharge-treated side of the PET film, and nylon film, using bar coater #4, respectively, and then heated and dried to form primer layers of 0.5 µm in dry film thickness, to prepare solid primer printed matters.

(Preparation of Printed Matters)

The aforementioned inkjet recording ink composition was discharged onto the aforementioned primer layers to perform solid printing using the PX105 printer manufactured by Seiko Epson Corporation, and then heated and dried, to obtain printed matters.

(Bleeding Evaluation)

Thin lines of approx. 0.3 mm were printed on the printed surfaces of the printed matters, and then observed for thickening due to bleeding, to evaluate bleeding according to the evaluation criteria below. The results are also shown in Table 1.

○: Printed in original thickness without bleeding.

Δ: Partially thicker, but two-fold or more increase in thickness is not observed.

x: Two-fold or more increase in thickness is observed all around.

(Lamination Suitability)

A two-component type polyurethane-based adhesive (TAKELAC A-385/TAKENATE A-50 ethyl acetate solution (both product names, manufactured by Mitsui Chemicals, Inc.)) was applied on the printed surfaces of the printed matters, after which a biaxially oriented polypropylene film was layered on top using a dry laminator, to obtain laminated products.

The obtained laminated products were aged for three days at 40° C., and then cut to thin strips of 15 mm in width and measured for T-type peel strength using a peel tester manufactured by Yasuda Seiki Seisakusho, Ltd., to evaluate lamination suitability according to the evaluation criteria below. The results are also shown in Table 1.

○: Peel strength is 100 g per 15-mm width or higher.

Δ: Peel strength is 50 g per 15-mm width or higher, but lower than 100 g per 15-mm width.

x: Peel strength is lower than 50 g per 15-mm width.

TABLE 1

| | | Examples | | | | | | | | | | | | Comparative Examples | | | | | | | |
|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 | 4 | 5 | 6 | 7 | 8 |
| Water-soluble multi-valent metal salts | Calcium acetate | 0.1 | 2.0 | 20.0 | — | — | 2.0 | 2.0 | 2.0 | 2.0 | 2.0 | 2.0 | — | 2.0 | 2.0 | 2.0 | 2.0 | 2.0 | 2.0 | 2.0 |
| | Calcium chloride | — | — | — | 2.0 | — | — | — | — | — | — | — | — | — | — | — | — | — | — | — |
| | Magnesium chloride | — | — | — | — | 2.0 | — | — | — | — | — | — | — | — | — | — | — | — | — | — |
| Polyester-based polyurethane emulsion 1 | | 2.0 | 2.0 | 2.0 | 2.0 | 2.0 | 0.1 | 1.0 | 5.0 | 25.0 | — | — | 2.0 | — | — | — | — | — | — | — |
| Polyester-based polyurethane emulsion 2 | | — | — | — | — | — | — | — | — | — | 2.0 | — | — | — | — | — | — | — | — | — |
| Polyester-based polyurethane emulsion 3 | | — | — | — | — | — | — | — | — | — | — | — | — | — | — | — | — | — | — | — |
| Polyether-based polyurethane emulsion | | — | — | — | — | — | — | — | — | — | — | — | — | — | 2.0 | — | — | — | — |
| Polycarbonate-based polyurethane emulsion | | — | — | — | — | — | — | — | — | — | — | 2.0 | — | — | — | 2.0 | — | — | — | — |
| Chlorinated polyolefin-based resin emulsion | | — | — | — | — | — | — | — | — | — | — | — | — | — | — | — | 2.0 | — | — | 2.0 |
| Polyvinyl acetate-based resin emulsion | | — | — | — | — | — | — | — | — | — | — | — | — | — | — | — | — | 2.0 | — | — |
| Acrylic-based resin emulsion | | — | — | — | — | — | — | — | — | — | — | — | — | — | — | — | — | — | 2.0 | — |
| Acetylenediol-based surface-active agent | | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Water | | 97.4 | 95.5 | 77.5 | 95.5 | 95.5 | 97.4 | 96.5 | 92.5 | 72.5 | 95.5 | 95.5 | 97.5 | 97.5 | 95.5 | 95.5 | 95.5 | 95.5 | 95.5 | 93.5 |
| Total | | 100 | 100 | 100 | 100 | 100 | 100 | 100 | 100 | 100 | 100 | 100 | 100 | 100 | 100 | 100 | 100 | 100 | 100 | 100 |
| Preservation stability | | ○ | ○ | △ | ○ | ○ | ○ | ○ | ○ | △ | ○ | ○ | ○ | ○ | ○ | × | ○ | ○ | ○ | ○ |
| OPP film | Bleeding | △ | ○ | ○ | ○ | ○ | ○ | ○ | ○ | ○ | ○ | ○ | × | ○ | ○ | ○ | ○ | ○ | ○ | ○ |
| | Lamination suitability | ○ | ○ | ○ | ○ | ○ | △ | △ | ○ | ○ | ○ | ○ | ○ | × | × | × | × | × | × | × |
| PET film | Bleeding | △ | ○ | ○ | ○ | ○ | ○ | ○ | ○ | ○ | ○ | ○ | × | ○ | ○ | ○ | ○ | ○ | ○ | ○ |
| | Lamination suitability | ○ | ○ | ○ | ○ | ○ | △ | △ | ○ | ○ | ○ | ○ | ○ | × | × | × | × | × | × | × |
| Nylon film | Bleeding | △ | ○ | ○ | ○ | ○ | ○ | ○ | ○ | ○ | ○ | ○ | × | ○ | ○ | ○ | ○ | ○ | ○ | ○ |
| | Lamination suitability | ○ | ○ | ○ | ○ | ○ | △ | △ | ○ | ○ | ○ | ○ | ○ | × | × | × | × | × | × | × |

In Table 1, the compounding quantities of the water-soluble multivalent metal salts are compounding quantities (in parts by mass) based on solids content.

In Table 1, the compound quantities of the emulsions are compounding quantities (in parts by mass) based on resin solids content.

In Table 1, the compounding quantities of the surface-active agent are in parts by mass (active ingredient 100%).

In Table 1, the compounding quantities of water are in parts by mass.

As shown in Table 1, all of the aqueous primer compositions containing water-soluble multivalent metal salt, polyester-based polyurethane emulsion, and water had good preservation stability, while also demonstrating high adhesion, and ability to add high resistance, to all of the OPP film, PET film, and nylon film.

Furthermore, they were able to form high-quality images with little bleeding or mottled appearance on all of the OPP film, PET film, and nylon film due to accelerated fixing of ink droplets.

Furthermore, they were able to produce printed matters having sufficient lamination strength and excellent lamination suitability on all of the OPP film, PET film, and nylon film.

On the other hand, the aqueous primer compositions not containing water-soluble multivalent metal salt or polyester-based polyurethane emulsion, either exhibited a preservation stability issue, or bled or encountered a lamination suitability issue on at least one of the OPP film, PET film, and nylon film.

What is claimed is:

1. An aqueous primer composition made for nonabsorbent media and containing a water-soluble multivalent metal salt, a polyester-based polyurethane emulsion, a surface-active agent, and water,
    wherein the water-soluble multivalent metal salt is one or more salts selected from the group consisting of a salt of an organic acid of a multivalent metal, a salt of an inorganic acid of a multivalent metal, and a hydrate of any of the forgoing, wherein the only multivalent metal is calcium, wherein a compounding quantity of the water-soluble multivalent metal salt is 0.1% by mass to 20.0% by mass in equivalent solids content in the aqueous primer composition, and
    the surface-active agent is constituted by one or more surface-active agents selected from the group consisting of acetylenediol-based surface-active agents, silicone-based surface-active agents, and fluorine-based surface-active agents, wherein a content of the surface-active agent is 0.1% to 1.0% by mass relative to 100% by mass of the aqueous primer composition.

2. The aqueous primer composition according to claim 1, wherein a content of the polyester-based polyurethane emulsion is 0.1% by mass to 25.0% by mass in equivalent resin solids content in the aqueous primer composition.

3. A set including the aqueous primer composition according to claim 1, and an inkjet recording ink composition.

4. A set including the aqueous primer composition according to claim 2, and an inkjet recording ink composition.

5. A printed matter comprising a base material layer, a primer layer formed from an aqueous primer composition containing a water-soluble multivalent metal salt and a polyester-based polyurethane emulsion as well as a surface-active agent, and a printing layer,
    wherein the water-soluble multivalent metal salt is one or more salts selected from the group consisting of a salt of an organic acid of a multivalent metal, a salt of an inorganic acid of a multivalent metal, and a hydrate of any of the forgoing, wherein the only multivalent metal is calcium, wherein a compounding quantity of the water-soluble multivalent metal salt is 0.1% by mass to 20.0% by mass in equivalent solids content in the aqueous primer composition, and
    the surface-active agent is constituted by one or more surface-active agents selected from the group consisting of acetylenediol-based surface-active agents, silicone-based surface-active agents, and fluorine-based surface-active agents, wherein a content of the surface-active agent is 0.1% to 1.0% by mass relative to 100% by mass of the aqueous primer composition.

* * * * *